United States Patent [19]

Imagawa et al.

[11] Patent Number: 5,479,570
[45] Date of Patent: Dec. 26, 1995

[54] LEARNING AND RECOGNITION MACHINE

[75] Inventors: Taro Imagawa, Kadoma; Toshiyuki Kouda, Nara; Yoshihiro Kojima, Kobe; Susumu Maruno, Osaka; Yasuharu Shimeki, Suita, all of Japan

[73] Assignee: Matsushita Electric Industrial Co., Ltd., Osaka, Japan

[21] Appl. No.: 130,851

[22] Filed: Oct. 4, 1993

[30] Foreign Application Priority Data

Oct. 6, 1992 [JP] Japan ..................................... 4-267663

[51] Int. Cl.⁶ .................................................. G06F 15/18
[52] U.S. Cl. ............................................. 395/20; 382/159
[58] Field of Search .................................. 395/11, 21, 22, 395/23, 24, 27, 20; 382/39, 14

[56] References Cited

U.S. PATENT DOCUMENTS 5,060,278  10/1991  Fukumizu ................................... 395/11
5,239,594   8/1993  Yoda ......................................... 395/11
5,247,584   9/1993  Krogmann ................................. 395/11
5,263,097  11/1993  Katz et al. ................................ 395/11
5,265,224  11/1993  Maruno ..................................... 395/24

Primary Examiner—Allen R. MacDonald
Assistant Examiner—Robert W. Downs
Attorney, Agent, or Firm—Beveridge, DeGrandi, Weilacher & Young

[57]  ABSTRACT

A learning and recognition machine has a major classification section for classifying an input pattern into a plurality of category groups and calculating a group belongingness to each category group and a plurality of fine classification sections for calculating a similarity within each category group. The machine causes the plurality of fine classification sections to learn in a coordinated manner by reflecting the group belongingness of the input pattern to update of a weight factor implemented in the fine classification sections, thereby allowing a recognition rate of a pattern situated at the boundary of the category groups to be improved and an effective supplemental learning to be performed.

24 Claims, 25 Drawing Sheets

LEARNING AND RECOGNITION MACHINE

BACKGROUND OF THE INVENTION

1. Field of the Invention

The present invention relates to a machine for learning and recognizing input pattern data.

2. The Related Art of the Invention

A prior art example of a pattern recognition machine for recognizing input data by implementing major classification on the input pattern data to select a category group to which the input data belongs and then by implementing fine classification in the selected category group is described, for example, in "Large Scale Neural Network 'CombNET-II'" Journal of the Institute of Electronics and Communication Engineers of Japan D-11, Vol. J75-D-11, No. 3 pp.545–553.

FIG. 1 illustrates a structure of the prior art pattern recognition machine, wherein a major classification section 101 coarsely classifies an input pattern signal into each category group. Fine classification sections 102 finely classify the input pattern signal into each category within the each category group. Some categories of one category group often overlap with some categories of another category group. A group selecting section 103 selects a plurality of category groups from the output values (hereinafter referred to as fidelity) of the major classification section 101. A fine classification section selecting section 104 selects the fine classification section 102 into which the input pattern signal is inputted based on the group selection information obtained from the group selecting section 103. A discriminating section 105 discriminates the input pattern signal from the fidelity of the category group selected in the group selecting section 103 and the output values of the fine classification section 102.

Input sections 106 in the major classification section 101 input the input pattern signal and multi-input/one-output(hereinafter referred to as multinput-output) signal processing sections 107 calculate the fidelity of each category group to the input pattern signal.

Input sections 108 in the fine classification section 102 input the input pattern signal output from the fine classification section selecting section 104. Multiinput-output signal processing sections 109 multiply the outputs of the under layer input sections 108 connected thereto or of the multi-input-output signal processing section 109 with weight factors which represent a degree of connection between them, respectively, and output the sum thereof after implementing threshold processing thereon. A degree of similarity to each category in the category group of the input pattern signal is found by connecting the plurality of multiinput-output signal processing sections in a network so as to have a layer structure, to have no connection mutually within each layer and to propagate signals only to the upper layers. A maximum value selecting section 110 selects the maximum value among outputs of the plurality of multiinput-output signal processing sections in the upper most layer.

Similarity calculating sections 111 in the discriminating section 105 calculate a similarity of each category from the fidelity of the category group selected by the group selecting section 103 and the output value of the fine classification section 102 corresponding to the category group. A category discriminating section 112 discriminates the input pattern signal by finding the maximum value of each category obtained from the similarity calculating sections 111.

The operation of the prior art pattern recognition machine constructed as described above will be described below. An input pattern signal X which consists of n feature data of an object to be recognized $$X = (x_1, x_2 \ldots, x_n) \tag{1}$$

is input to the input sections 106 of the major classification section 101 at first. The input sections 106 are prepared by n pieces equally to the number of feature data of the pattern data and each feature data $x_i$ is input respectively to the corresponding input section 106. Each multiinput-output signal processing section 107 in the major classification section 101 multiplies an input $x_j$ of the input section 106 connected thereto with a weight factor $v_{ij}$ ($1 \leq i \leq m_r$, $m_r$ is the number of category groups, $1 \leq j \leq n$) which represents a degree of their connection, calculates the sum of them, divides the sum by the product of norms |X| and |$V_i$| of the input pattern signal X and a weight factor vector $v_i$ (Exp. 2) of each multiinput-output signal processing section 107 and outputs the result.

$$V_i = (v_{i1}, v_{i2} \ldots, v_{in}) \tag{2}$$

That is, the output value sim (X, $V_i$) of the multiinput-output signal processing section 107 which has the weight factor vector $V_i$ may be expressed as follows:

$$\text{sim}(X, V_i) = (X * V_i)/(|X| |V_i|) \tag{3}$$

where, $X * V_i = \Sigma j(x_j, v_{ij})$
$|X| = (\Sigma x_j^2)^{1/2}$
$|V_i| = (\Sigma v_{ij}^2)^{1/2}$ Here, $\Sigma j$ represents the sum of j.

By the way the weight factor vector $V_i$ is designed beforehand so that a predetermined multiinput-output signal processing section generates the maximum output to a similar input pattern signal.

According to the prior art examples, such weight factor vector $V_i$ is designed by the following method. In a first process, Vc whose sim (X, $VV_i$) is largest (this case is called that X matches to Vc in optimum) is found to approach Vc to X every time when the input pattern signal X for designing weight factor vector is input. When input pattern signals which match to one weight factor vector in optimum reach more than a certain number, an area which the weight factor vector covers is divided into two. In a second process, $V_i$ which matches in optimum to all the input pattern signals for designing weight factor vector is found and is checked if it has changed from the previous one. If there has been a change, the $V_i$ is modified. At this time, the weight factor vector is divided similarly to the case in the first process. This process is repeated until the modification and division of the weight factor vector end.

The input pattern signal is coarsely classified into a plurality of category groups by thus designing the weight factor vector. The output value of each of the multiinput-output signal processing sections 107 is output to the group selecting section 103 as a fidelity of each category group to the input pattern signal X.

The group selecting section 103 selects an arbitrary number of category groups in an order from those having a large fidelity obtained in the major classification section 101 and outputs group selection information indicating which category groups have been selected and corresponding fidelities.

The fine classification section selecting section 104 selects the fine classification sections 102 to which the input pattern signal is input based on the group selection information obtained from the group selecting section 103 and outputs the input pattern signal to those fine classification sections 102.

In each of the fine classification sections 102, which correspond to the category groups selected in the group selecting section 103 (i.e., the fine classification sections to which the input pattern signal has been input from the fine classification section selecting section 104), the input pattern signal X is input to the input sections 108. The input sections 108 are prepared by n equally to the number of feature data of the pattern signal, and each feature data $x_i$ is input to corresponding input section 108, respectively. Each of the multiinput-output signal processing sections 109 in the fine classification section 102 multiplies the output of the underlayer input section 108 connected thereto or of the multiinput-output signal processing section 109 with the weight factor which represents a degree of their connection, respectively, transform the sum thereof by a threshold function and then outputs the resultant value to the upper layer. Here, the multiinput-output signal processing sections 109 in the most upper layer in each fine classification section 102 are set to be the same number with the number of categories of pattern data contained in each category group and each of the multiinput-output signal processing sections 109 in the upper most layer corresponds to each of those categories. The maximum value selecting section 110 selects the maximum value among the output values of each of the multiinput-output signal processing sections 109 in the upper most layer and outputs the category that corresponds to the multiinput-output signal processing section 109 and the maximum output value thereof.

By the way, the weight factor of each multiinput-output signal processing section 109 has been learned beforehand so that the multiinput-output signal processing section 109 in the upper most layer which corresponds to each category generates the maximum output for the input pattern signal having such category in the category group.

In concrete, such a weight factor learning-method is implemented by a learning algorithm called Back-Propagating Errors. The Back-Propagating Errors has been proposed, for example, by D. E. Rumelhart, G. E. Hinton and R. J. Williams in "Learning Representations by Back-Propagating Errors", Nature, vol. 323, pp. 533–536, Oct. 9, 1986.

An outline of the Back-Propagating Errors will be described below.

At first, a pattern signal X for learning weight factor is input to the input sections 108 of the fine classification section 102. As described before, each of the multiinput-output signal processing sections 109 multiplies the output of the underlayer input sections 108 respectively connected thereto or of the multiinput-output signal processing section 109 with the weight factor which represents a degree of their connection, respectively, transform the sum thereof by a threshold function and then outputs the resultant value to the upper layer. Here, an error E between output signals $O_k$ of all the multiinput-output signal processing sections 109 in the upper most layer and a desirable output signal $t_k$ (referred to as a teacher signal) may be found as follows:

$$E=0.5 \Sigma_p \Sigma_k (t_k - o_k)^2 \quad (4)$$

Where, $\Sigma_p$ is the sum of the number of patterns of the teacher signal. The purpose of the learning is to determine a value of the weight factor that minimizes the error E, and modification amount $\Delta W_{ij}$ of the weight factor among each multiinput-output signal processing section 109 is calculated based on the following expression:

$$\Delta W_{ij} = -\epsilon \partial E/\partial W_{ij} \quad (5)$$

Where, $\epsilon$ is a positive constant called a learning rate. The error E may be reduced by repeating the update of weight factor based on such Expression (5) every time when a pattern signal for learning is input. When the error E becomes sufficiently small, the learning is finished assuming that the output signal has sufficiently come close to the desired value.

Such weight factor learning method allows each multiinput-output signal processing section 109 in the upper most layer which corresponds to each category to generate the maximum output for the input pattern signal having such category in the category group. Accordingly, the category of the input pattern signal may be recognized in each category group or in each fine classification section by selecting one that generates the maximum output among the plurality of multiinput-output signal processing sections 109 in the upper most layer by the maximum value selecting section 110.

In the discriminating section 105, the similarity calculating sections 111 first calculate the similarity of each category obtained in the fine classification section 102 from the fidelity of the category group selected by the group selecting section 103 and the output value of the fine classification section 102 that corresponds to that category group, using Expression 6, and output those similarities to the category discriminating section 112.

$$(\text{Similarity})=(\text{Fidelity})^a (\text{Output value})^b \quad (6)$$

Where, a and b are real constants.

Finally, the category discriminating section 112 compares the similarities of each category obtained from the similarity calculating sections 111 and outputs the category that corresponds to the similarity which is largest among them as a discrimination result.

In the structure as described above, however, the learning of each fine classification section is carried out totally independently in the single fine classification section without considering a degree of belonging of the input pattern signal to the category group, i.e. a group belongingness, so that recognition accuracy of an input pattern situated at the boundary between category groups is degraded.

Furthermore, there has been a problem that when an unlearned pattern has been erroneously recognized and that pattern is to be learned again (i.e., supplemental learning), the supplemental learning cannot be implemented because the category of the pattern may not be belonging to the fine classification section in which the group belongingness has been determined to be maximum in the major classification section and hence that no determination can be made as to which fine classification section should be learned.

SUMMARY OF THE INVENTION

Accordingly, it is an object of the present invention to provide a learning and recognition machine which allows for the adding of new categories to the fine classification section as necessary, to learn each fine classification section in a coordinated manner using the group belongingness for input pattern, to improve the recognition rate of a pattern situated at the boundary of category groups and to implement the supplemental learning efficiently.

The learning and recognition machine of the present invention comprises:

a major classification section for calculating a group belongingness which indicates a degree of how close an input pattern signal belongs to a category group composed of a set of similar categories, a plurality of fine classification sections each having an in-group similarity calculating section for calculating an in-group similarity which indicates a degree of how close the input pattern signal belongs to a category in each category group and a weight factor updating section for updating weight factors of the in-group similarity calculating section;

a discrimination signal loading section for weighting the in-group similarity by the group belongingness;

a category discriminating section for comparing the weighted in-group similarity output from the discrimination signal loading section;

a teacher signal generating section for generating a teacher signal necessary for learning;

a learning control section for outputting learning control signal for controlling weights of the in-group similarity calculating section based on the teacher signal output from the teacher signal generating section and based on the output of the discrimination signal loading section or of the category discriminating section; and a learning control signal loading section for weighting the learning control signal output from the learning control section by the group belongingness output from the major classification section; and the weight updating section updating the weight factor of the in-group similarity calculating section based on the outputs of the learning control signal loading section and of the in-group similarity calculating section.

The manner in which the foregoing and other objects of the present invention are accomplished will be apparent from the accompanying specification and claims considered together with the drawings.

DETAILED DESCRIPTION OF PREFERRED EMBODIMENT

Figure 1:
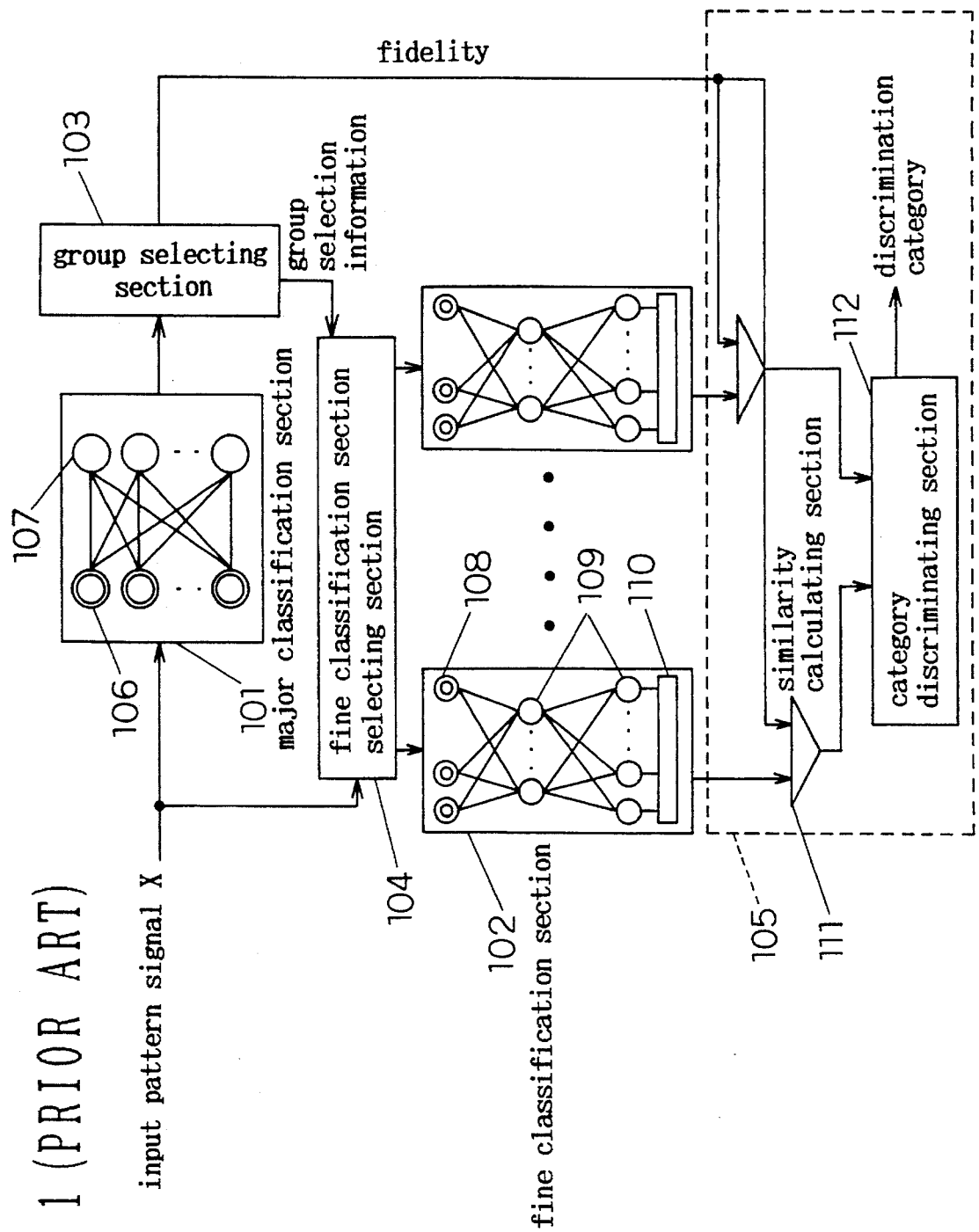
FIG. 1 is a block diagram showing a preferred embodiment of a prior art learning and recognition machine.

Referring now to the drawings wherein like reference characters denote like parts throughout various views, preferred embodiments of the present invention will be explained in detail.

As pattern signals generally input to a learning and recognition machine, there are a time series pattern such as voice and a spatial pattern such as character and image, and any pattern signal may be processed in the present invention.

Figure 2:
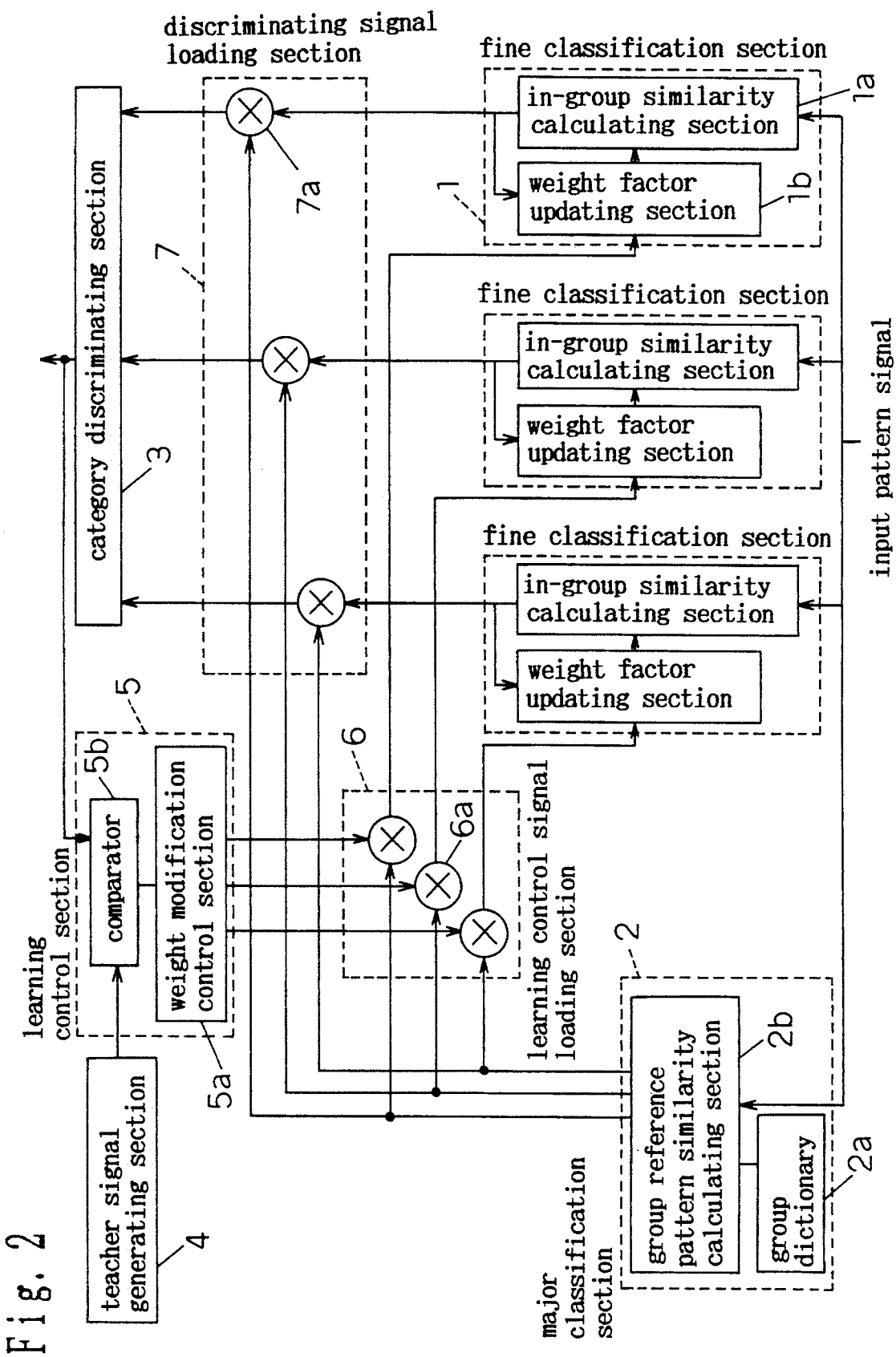
FIG. 2 is a block diagram showing a first preferred embodiment of a learning and recognition machine of the present invention.

FIG. 2 is a block diagram showing a first preferred embodiment of a learning and recognition machine of the present invention. In the figure, each of fine classification sections 1 comprises an in-group similarity calculating section 1a for calculating an in-group similarity which represents a degree of resemblance of an input pattern signal to each category contained in a category group and a weight factor updating section 1b for updating a weight factor of the in-group similarity calculating section 1a in accordance to the outputs of the in-group similarity calculating section 1a and of a learning control signal loading section 6 which is described later. A major classification section 2 calculates a group belongingness which represents a degree of belonging of the input pattern signal to each category group which comprises similar patterns. A group dictionary 2a stores a plurality of group reference pattern signals which represent category groups. A group reference pattern similarity calculating section 2b calculates a group belongingness using the group reference pattern signals from the group dictionary 2a. A discriminating signal loading section 7 weights the in-group similarity obtained in the fine classification section 1 by the group belongingness calculated in the major classification section 2. In the discrimination signal loading section 7, multipliers 7a multiply the group belongingness calculated in the major classification section 2 with the in-group similarity obtained from the fine classification section 1. A category discriminating section 3 discriminates the category of the input pattern signal by selecting a plurality of output values of the multipliers 7a which is large per each category, by calculating the sum of those output values (category similarity) and then by finding the maximum value from the category similarity. A teacher signal generating section 4 generates a teacher signal. In a learning control section 5, a comparator 5b compares the output of the teacher signal generating section 4 with the output of the category discriminating section 3 and a weight modification control section 5a outputs 1 to the fine classification section in which the both do not agree and the category of the input pattern signal exists and 0 when the both agree, as a direction signal for implementing learning based on the comparison result of the comparator 5b. A learning control signal loading section 6 weights the direction signal output from the learning control section 5 by the group belongingness.

Figure 3:
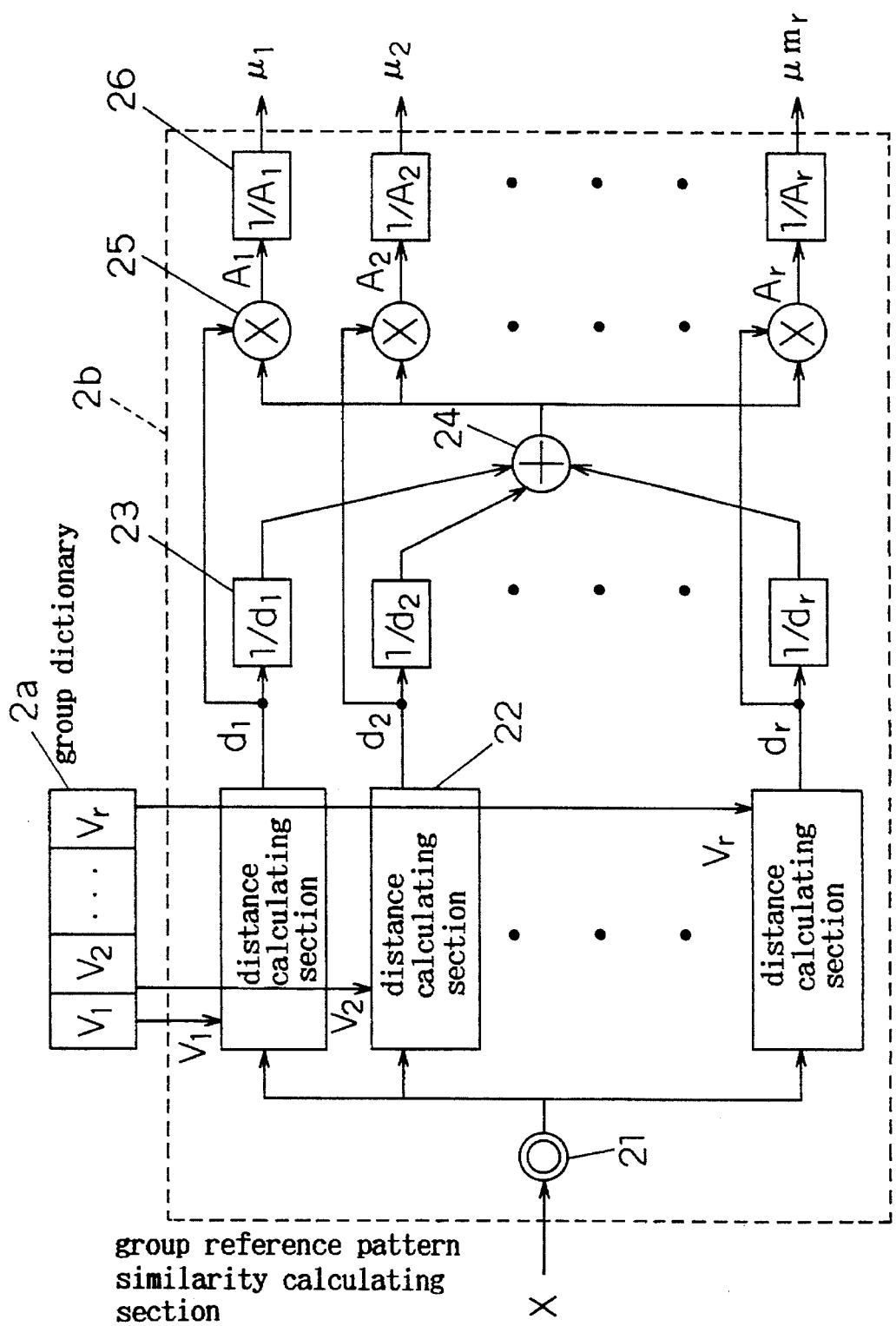
FIG. 3 is a block diagram showing one preferred embodiment of a major classification section used in the learning and recognition machine of the present invention.

FIG. 3 is a block diagram showing one preferred embodiment of a structure of the major classification section 2. The group dictionary 2a stores a plurality of group reference pattern signals which represent category groups comprising a set of similar patterns. The group reference pattern similarity calculating section 2b calculates the group belongingness using the group reference pattern signals from the group dictionary 2a. An input section 21 inputs an input pattern signal. Each distance calculating section 22 calculates distances between all the group reference pattern signals and the input pattern signal. Each divider 23 calculates the inverse number of the output of the distance calculating section 22. An adder 24 finds the sum of the output of each divider 23. Each multiplier 25 multiplies the output of the adder 24 with the output of the distance calculating section 22. Each divider 26 calculates the inverse number of the output of the multiplier 25.

Figure 4:
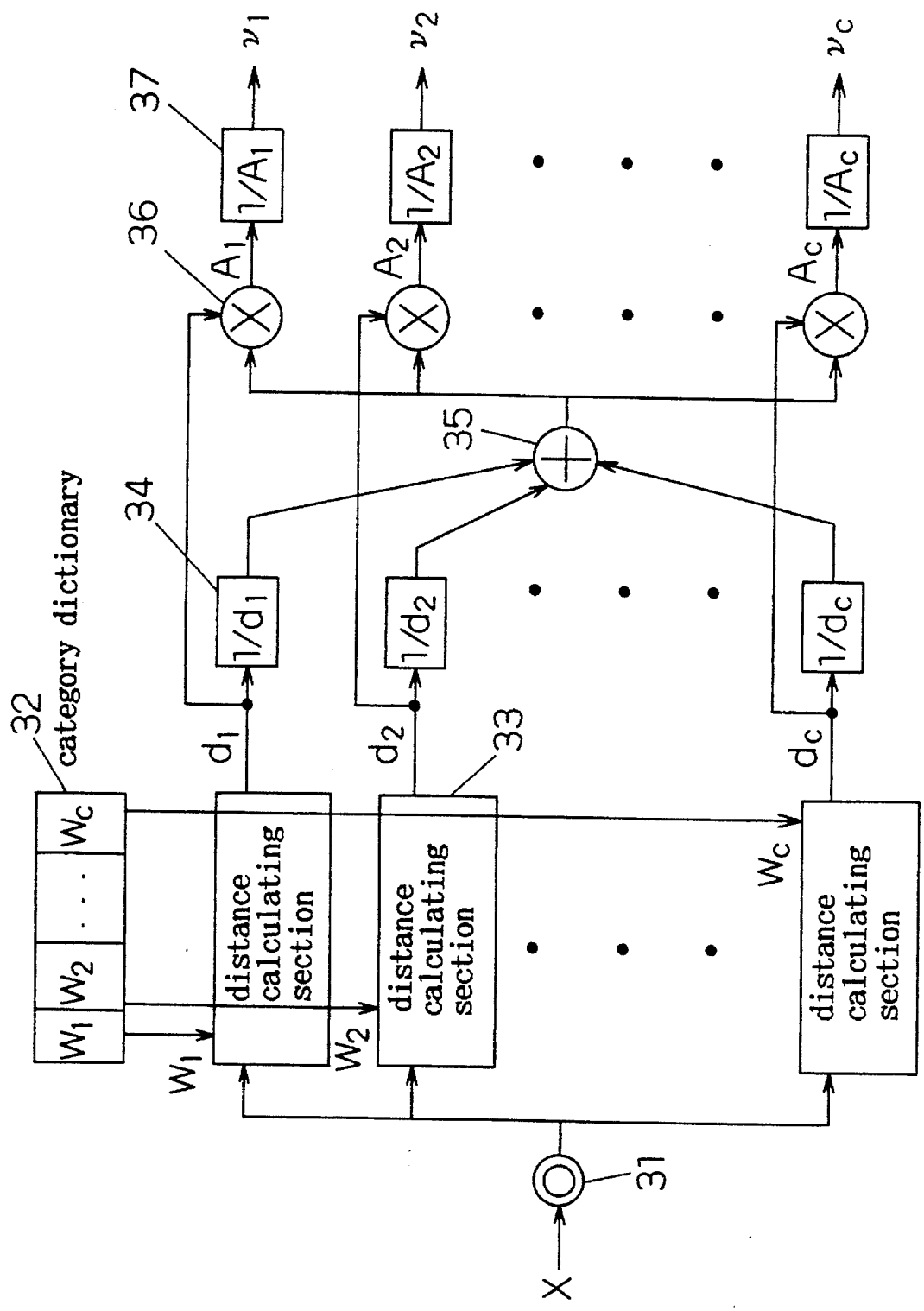
FIG. 4 is a block diagram showing a first embodiment of a similarity calculating section used in the learning and recognition machine of the present invention.

FIG. 4 is a block diagram showing a first embodiment of the similarity calculating section 1a in the fine classification section 1. In the figure, an input section 31 inputs an input pattern signal. A category dictionary 32 stores a plurality of category reference pattern signals which indicates a central value of each category group of the input pattern signal. Each distance calculating section 33 calculates distances between all the category reference pattern signals and the input pattern signal. Each divider 34 calculates the inverse number of the output of the distance calculating section 33. An adder 35 finds the sum of outputs of each divider 34. Each multiplier 36 multiplies the output of the adder 35 with the output of the distance calculating section 33. Each divider 37 calculates the inverse number of the output of the multiplier 36.

The operation of the learning and recognition machine constructed as described will be explained below. An input pattern signal X (Expression 7) composed of n feature data of an object to be recognized $$X=(x_1, x_2 \ldots , x_n) \quad (7)$$

is input to the major classification section 2 at first. In the major classification section 2, the input section 21 outputs the input pattern signal X to r distance calculating sections 22. Each of the distance calculating sections 22 reads group reference pattern signal $V_i$ ($1 \leq i \leq r$; r is the number of group reference pattern signals or the number of category groups) which represent each of the category groups stored in the group dictionary 2a, calculates a distance $d_i$ between X and $V_i$ shown in Expression (8) and outputs the result respectively to the corresponding dividers 23 and multipliers 25. f is a real number that satisfies f>1.

$$d_i=\| X-V_i \|^{2/(f-1)} \quad (1 \leq i \leq r) \quad (8)$$

Each divider 23 calculates the inverse number of the distance $d_i$ and outputs the result to the adder 24. The adder 24 calculates the sum of the outputs of all the dividers 23 and outputs the result to r multipliers 25. Each multiplier 25 multiplies the output of the corresponding distance calculating section 22 with that of the adder 24 and inputs the result to the corresponding divider 26. Each divider 26 calculates the inverse number of the output of the corresponding multiplier 25. The output of each divider 26 is output finally from the major classification section 2 as a group belongingness $\mu_i$ ($1 \leq i \leq r$) of each category group to the input pattern signal X. That is, the group belongingness $\mu_i$ ($1 \leq i \leq r$) of each category group may be expressed as follows:

$$\mu_i = 1/\Sigma_{k=1}^{r} (d_i/d_k) \quad (9)$$

Where $\Sigma_{k=1}^{r}$ represents the sum from 1 to r of k.

By the way, the group reference pattern signal representing each category group stored in the group dictionary 2a is designed beforehand by using a conventional cluster ring method such as K average algorithm described in "Pattern Information Processing" by Shin Nagao, The Institute of Electronics and Communication Engineers of Japan, Corona Publishing Co. and Isodata algorithm or LBG algorithm described in "An Algorithm for Vector Quantizer Design" by Y. Linde, A. Buzo and R. M. Gray, IEEE Trans. Commun., COM-28, 1, pp. 84–95, Jan. 1980.

A method for designing the group dictionary 2a using the K average algorithm will be briefly explained below.

Step 1: Select r (r is a predetermined number of category groups) pattern signals adequately from a set of pattern signals for designing a group dictionary of an object to be recognized and denote them as r group reference pattern signals $V_i$ ($1 \leq i \leq r$).

Step 2: Find $V_i$ which minimizes the distance $d_i$ shown in Expression (10) respectively for all pattern signals X for designing group dictionary.

$$d_i = \| X - V_i \| \quad (10)$$

At this time, X is assumed to belong to category groups $S_i$ ($1 \leq i \leq r$).

Step 3: Find an average value of the pattern signal X belonging to each $S_i$ and denote the result thereof as $V_i'$.

Step 4: If $V_i' = V_i$ satisfies for all i, store the group reference pattern signal $V_i$ at this time to the group dictionary 2a. If not, return to Step 2 considering $V_i'$ as new group reference pattern signal $V_i$.

All pattern signals may be divided into several subsets of similar pattern signals (category groups) by thus designing the group reference pattern signals. Isodata algorithm and LBG algorithm are basically almost the same with this K average algorithm.

In the in-group similarity calculating section 1a of each fine classification section 1, the input section 31 outputs the input pattern signal X to c distance calculating sections 33. Each of the distance calculating sections 33 reads the category reference pattern signal (weight factor) $W_j$ ($1 \leq j \leq c$; c is the number of category reference pattern signals) which indicates the central value of each category stored in the category discriminating section 32, calculates a distance $d_j$ between X and $W_j$ shown in Expression (11) and outputs the result thereof respectively to the corresponding dividers 34 and multipliers 36.

$$d_j = \|X - W_j\|^{2/(f-1)} \quad (11)$$

Where, f is a real number which satisfies f>1.

Each divider 34 calculates the inverse number of the distance $d_j$ and outputs the result to the adder 35. The adder 35 calculates the sum of the outputs of all of the dividers 34 and outputs the result to c multipliers 36. Each multiplier 36 multiplies the output of the corresponding distance calculating section 33 with that of the adder 35 and inputs the result to the corresponding divider 37. Each divider 37 calculates the inverse number of the output of the corresponding multiplier 36. The output of each divider 37 is output finally from the fine classification section 1 as an in-group similarity vector of each category to the input pattern signal X ($v_1, v_2, \ldots v_c$) to the discrimination signal loading section 7. That is, the in-group similarity of each category in the fine classification section 1 may be expressed as follows:

$$v_j = 1/\Sigma_{k=1}^{c} (d_j/d_k) \quad (12)$$

Where $\Sigma_{k=1}^{c}$ indicates the sum from 1 to r of c.

In the discrimination signal loading section 7, the multiplier 7a multiplies group belongingness $\mu_i$ of the i-th category group calculated in the major classification section 2 with the in-group similarity vector ($v_1, v_2, \ldots v_c$) obtained from the fine classification section 1 which corresponds to the category group and outputs the result thereof to the category discriminating section 3. That is, the number of the multipliers 7a prepared is (the number of group reference pattern signals x the sum of the numbers of category reference pattern signals in each fine classification section), and an output value $\xi_{pq}$ of the multipliers 7a to which group belongingness $\mu_p$ of category group p ($1 \leq p \leq r$; r is the number of category groups) and in-group similarity $v_{pq}$ of a certain category q ($1 \leq q \leq c$; c is the number of categories belonging to the category group) obtained from the fine classification section 1 that corresponds to the category group p may be expressed as follows:

$$\xi_{pq} = \mu_p * v_{pq} \quad (13)$$

The category discriminating section 3 classifies the output values of all the multipliers 7a together per each category and selects a plurality of output values which are large. It then finds the sum of those selected output values per each category as a category similarity $r_s$ ($1 \leq s \leq N_c$; Nc is the number of categories) and outputs the category that corresponds to the maximum similarity among them as a recognition result. By the way, the method for selecting a plurality of output values of the multipliers 7a per each category may be one that selects the output values of the multipliers 7a which are above a certain threshold value.

Synchronizing with the input pattern signal X, the teacher signal generating section 4 generates a teacher signal vector $T=(t_1, t_2, \ldots tN_c)$ in which only an element which corresponds to the category of the pattern X is "1" and others are "0". Based on the comparison result of the output value of the discrimination signal loading section 7 with the teacher signal, the learning control section 5 outputs, as a direction signal E for implementing learning, "1"to the fine classification section in which the both do not agree and the category of the input pattern signal exists and "0" when they agree.

The learning control signal loading section 6 multiplies a direction signal $E_p$ (direction signal to the p-th fine classification section) with the group belongingness by the multiplier 6a as shown in Expression (14) and outputs the result thereof to the weight factor updating section 1b of the corresponding fine classification section 1. The weight factor updating section 1b updates the category reference pattern signal (weight factor) of the in-group similarity calculating section 1a from the output of the in-group similarity calculating section 1a and that of the learning control signal loading section 6 by using a method for example similar to a learning algorithm called Learning Vector Quantization (LVQ).

$$E'_p = E_p * \mu_p \quad (14)$$

Where, $E'_p$ represents a loaded learning control signal to the p-th fine classification section, $E_p$ a learning control signal to the p-th category and $\mu_p$ a group similarity to the fine classification section to which the loaded learning control signal is input.

The Learning Vector Quantization is described for example in "Learning Vector Quantization for Pattern Recognition" by T. Kohonen, Helsinki University of Technology, Report TKK-F-A601 (1986.11).

The Learning Vector Quantization will be briefly explained exemplifying the p-th fine classification section below. The initial value of the category reference pattern signal $W_j$ is prepared beforehand from the pattern signal for designing the category dictionary composed of a set of input pattern signals contained in each category group by a method arbitrary selected or by the conventional cluster ring method such as the K average algorithm described in the explanation of the design of the group dictionary 2a, and the following steps are executed to each fine classification section every time when the input pattern signal X is input.

Step 1: Select a category reference pattern signal $W_k$ whose similarity is the largest among the in-group similarity $v_j$ and denotes the category of Wk as Ck.

Step 2: When the category of the input pattern signal X and Ck agree, approach $W_k$ to X proportionally to the output $E'_p$ of the learning control signal loading section 6. When the both do not agree, distance $W_k$ from X proportionally to $E'_p$. The category reference pattern signals other than $W_k$ will not be updated. However, the above procedures may be omitted for fine classification sections whose group belongingness is small.

This learning and recognition machine can recognize the input pattern by repeating the aforementioned learning operations until all the discrimination results to the input pattern signal X agree to its category.

As described above, according to the present embodiment, the weight of each fine classification section is modified based on the learning control signal weighted by the group belongingness output by the major classification section, so that the fine classification sections in which the category to which the input pattern signal belongs learn in a coordinated manner and it is possible to improve a recognition rate of a pattern situated at the boundary of the category groups.

Figure 5:
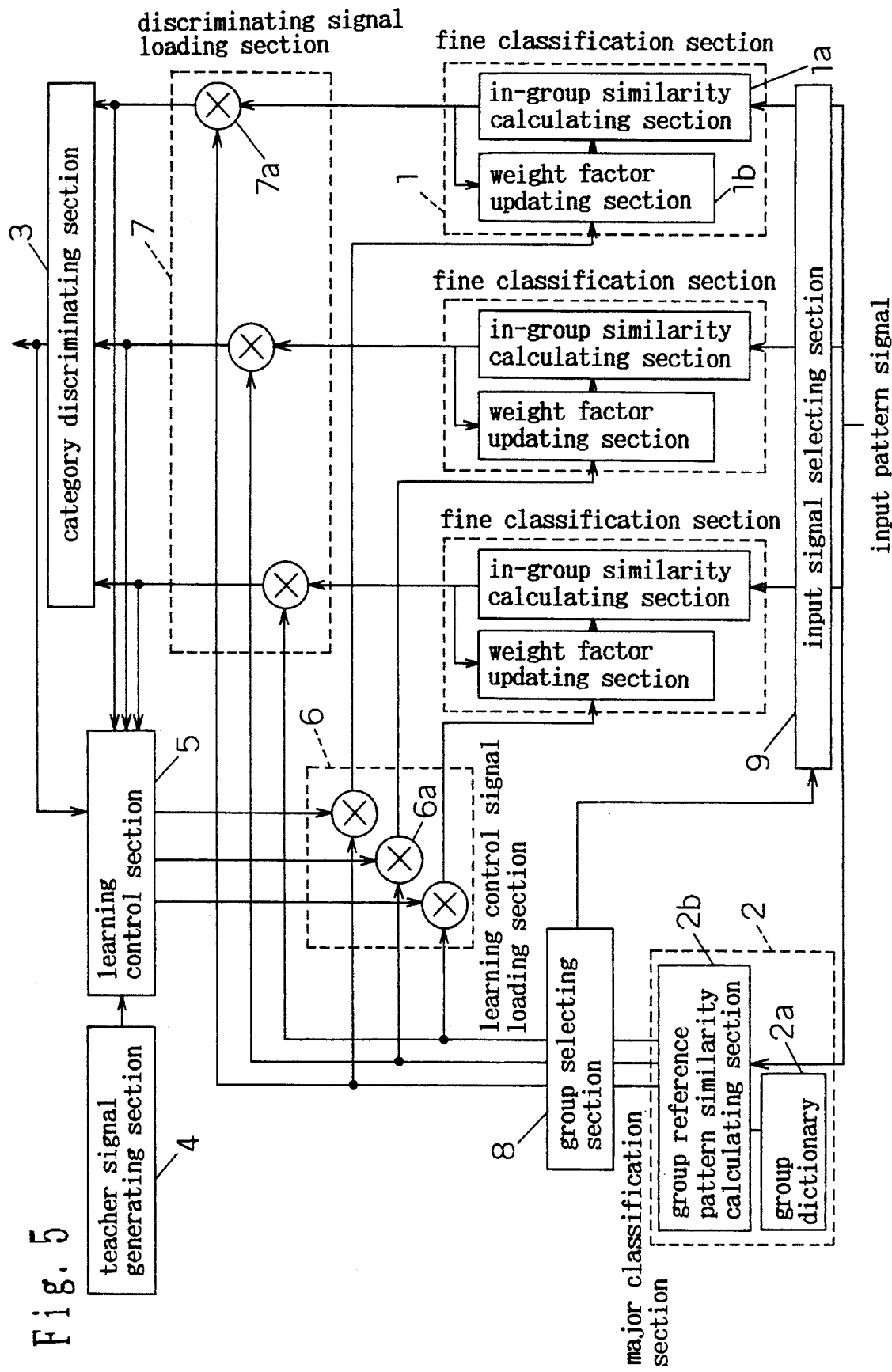
FIG. 5 is a block diagram showing a second preferred embodiment of the learning and recognition machine.

FIG. 5 illustrates a second preferred embodiment of the learning and recognition machine of the present invention, wherein a group selecting section and an input signal selecting section are included. In the figure, the fine classification section 1, the in-group similarity calculating section 1a, the weight factor updating section 1b, the major classification section 2, the group dictionary 2a, the category discriminating section 3, the teacher signal generating section 4, the learning control section 5, the learning control signal loading section 6, the discrimination signal loading section 7 and the multipliers 6a and 7a operate in the same manner with those described in the first embodiment. In addition to them, according to the present embodiment, the group selecting section 8 selects a plurality of category groups based on group belongingness output by the major classification section 2 and the input signal selecting section 9 selects a fine classification section to which an input pattern signal is input based on the selection result of the group selecting section 8.

In operation, though the learning and recognition operations are the same with those of the first embodiment of the learning and recognition machine described above, the group selecting section 8 selects a category group whose group belongingness is large (for example, selects a category group having a large group belongingness exceeding a threshold value) and outputs the result thereof to the input signal selecting section 9. It also outputs group belongingness of only those selected category groups to the learning control signal loading section 6 and the discrimination signal loading section 7.

As described above, according to the present embodiment, recognition and learning of the fine classification section are implemented only for the category group having a large group belongingness selected by the group selecting section 8, so that learning and recognition can be implemented effectively at high speed.

Figure 6:
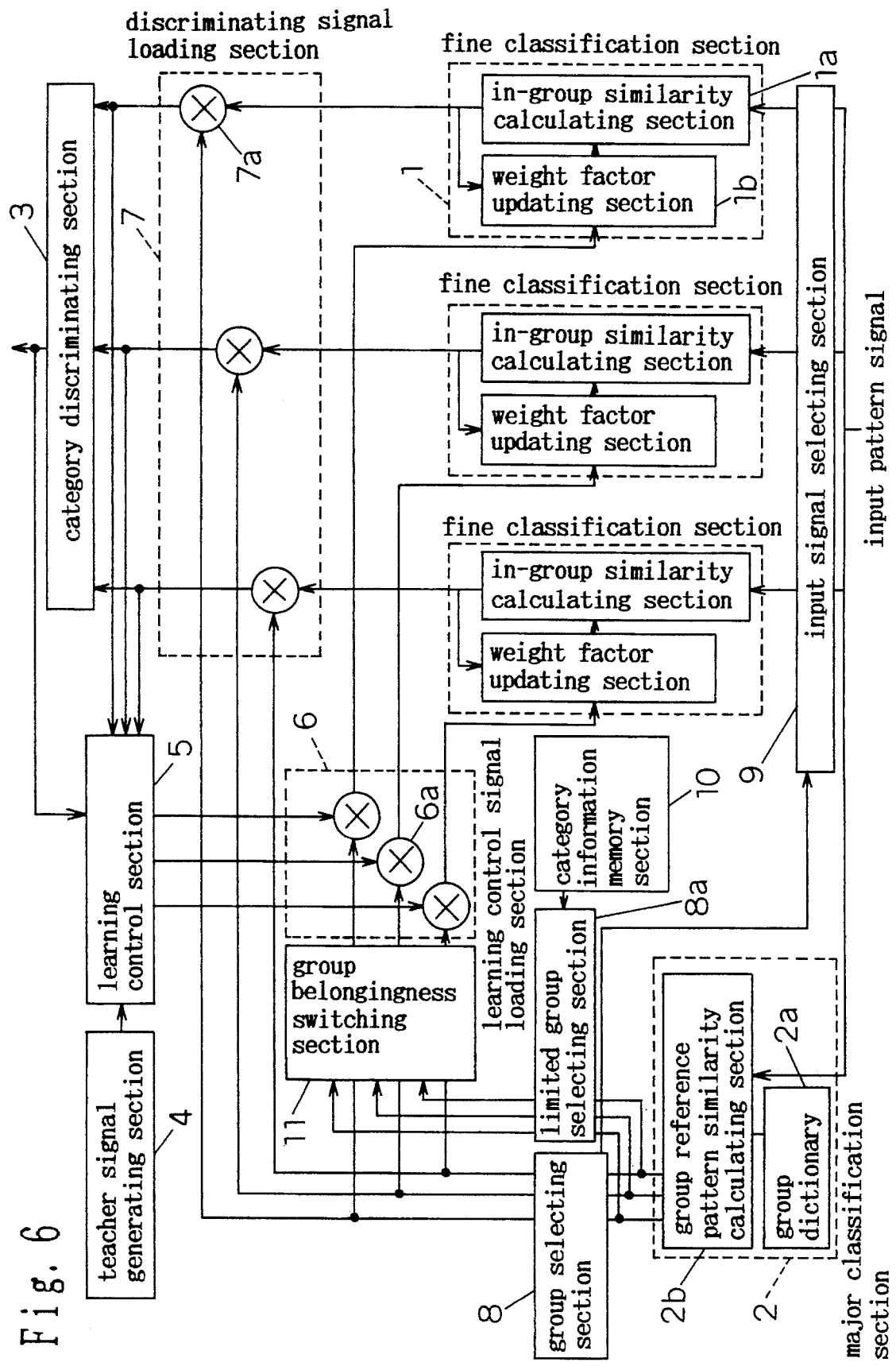
FIG. 6 is a block diagram showing a third preferred embodiment of the learning and recognition machine.

FIG. 6 illustrates a third preferred embodiment of the learning and recognition machine of the present invention, wherein a limited group selecting section 8a and a group belongingness switching section 11 are included. In the figure, the fine classification sections 1, the in-group similarity calculating section 1a, the weight factor updating section 1b , the major classification section 2, the group dictionary 2a, the category discriminating section 3, the teacher signal generating section 4, the learning control section 5, the learning control signal loading section 6, the discrimination signal loading section 7, the multipliers 6a and 7a, the group selecting section 8 and the input signal selecting section 9 operate in the same manner with those described in the second embodiment. In addition to them, according to the present embodiment, a category information memory section 10 stores information of categories belonging to each fine classification section 1 and the limited group selecting section 8a finds the fine classification section in which the category of the input pattern signal exists during learning based on the memory contents of the category information memory section 10 and selects at least one group belongingness having a larger value in the fine classification section, thereby allowing to prevent an inconvenience which is otherwise caused when the group belongingness of the fine classification section in which the category of the input pattern signal does not exist happens to be large. The group belongingness switching section 11 switches the output of the group selecting section 8 and that of the limited group selecting section 8a and outputs to the learning control signal loading section 6.

In operation, though the learning and recognition operations are the same with those in the second embodiment of the learning and recognition machine described above, the group belongingness switching section 11 switches the group belongingness so that the group belongingness of the group selecting section 8 is output to the learning control signal loading section 6 during initial learning and the group belongingness of the limited group selecting section 8a is output to the learning control signal loading section 6 during supplemental learning.

Accordingly, when an unlearned input pattern signal is to be learned, the present embodiment allows supplemental learning of the unlearned pattern because the limited group selecting section 8a selectively outputs the group belongingness to the fine classification section in which the category of the input pattern signal exists. Furthermore, because only the fine classification section which is related to the input pattern signal learns, the supplemental learning hardly influences the whole learning and recognition machine, realizing supplemental learning which hardly influences performance of recognition of patterns already learned.

Figure 7:
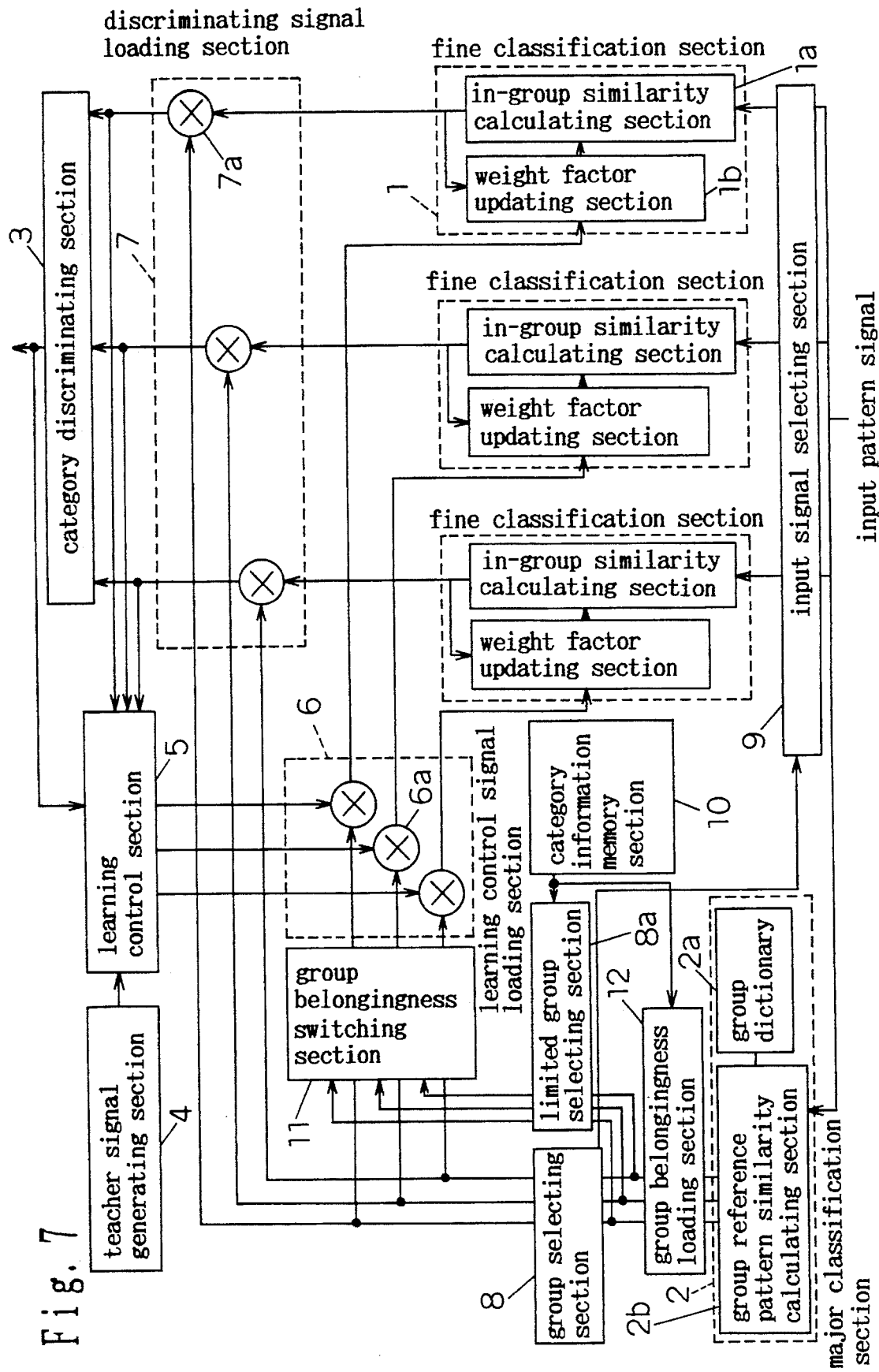
FIG. 7 is a block diagram showing a fourth preferred embodiment of the learning and recognition machine.

FIG. 7 illustrates a fourth preferred embodiment of the learning and recognition machine of the present invention, wherein a group belongingness loading section 12 is included. In the figure, the fine classification sections 1, the in-group similarity calculating section 1a, the weight factor updating section 1b, the major classification section 2, the group dictionary 2a, the category discriminating section 3, the teacher signal generating section 4, the learning control section 5, the learning control signal loading section 6, the discrimination signal loading section 7, the multipliers 6a and 7a, and the category information memory section 10 operate in the same manner with those described in the third embodiment. In addition to them, according to the present embodiment, the group belongingness loading section 12 weights the output of the major classification section 2 based on the memory content of the category information memory section 10.

Figure 8:
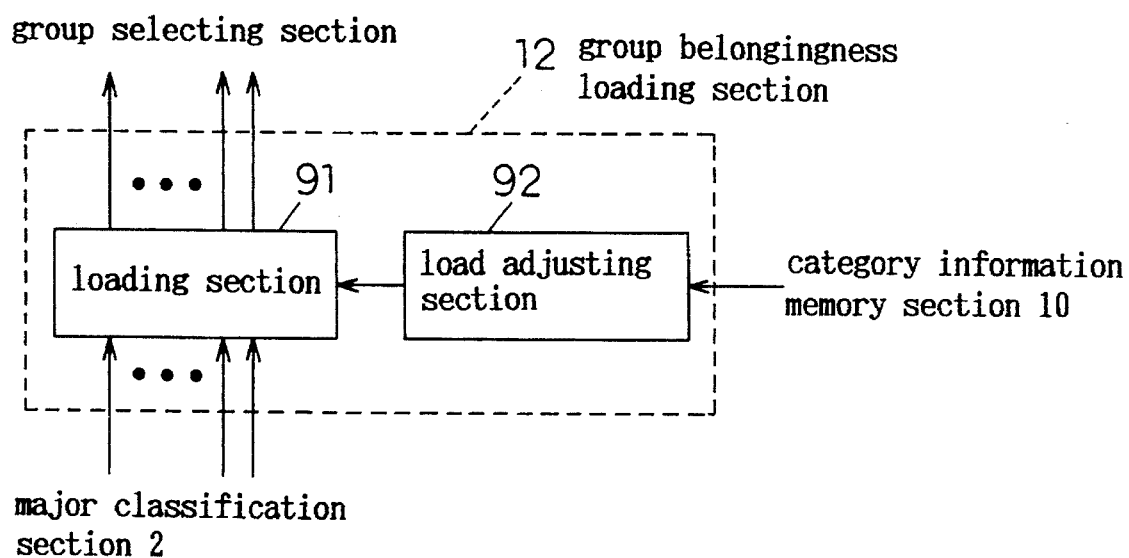
FIG. 8 is a block diagram showing a preferred embodiment of a group belongingness loading section used in the learning and recognition machine.

FIG. 8 is a block diagram showing one preferred embodiment of the group belongingness loading section 12. In the figure, a loading section 91 weights outputs of the major classification section 2. A load adjusting section 92 selects a category group in which the category of the input pattern exists by information of the category belonging to each fine classification section memorized in the category information memory section 10 and adjusts a load of the loading section 92 so that a group belongingness of the category group becomes large.

In operation, though the learning and recognition operations are the same with those described in the third embodiment of the learning and recognition machine, the group belongingness loading section 12 weights the group belongingness while adjusting the load so that the group belongingness of the fine classification section in which the category of the input pattern exists becomes large based on the memory content of the category information memory section 10.

As described above, according to the present embodiment, because the group belongingness loading section 12 increases the group belongingness to the fine classification section in which the category of the input pattern signal exists, learning of the fine classification section which is related to the input pattern signal is emphasized, allowing effective supplemental learning of an unlearned pattern.

Figure 9:
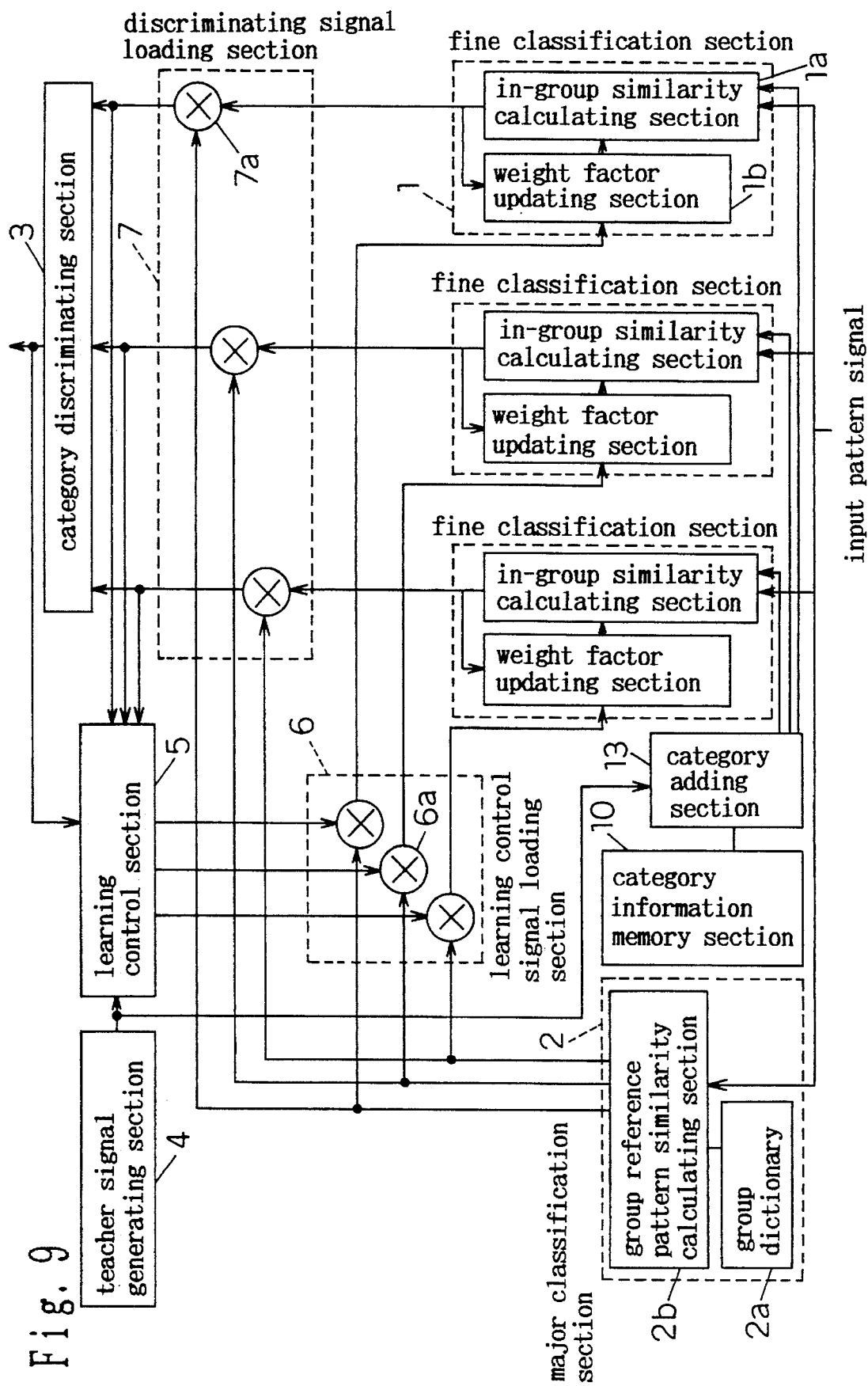
FIG. 9 is a block diagram showing a fifth preferred embodiment of the learning and recognition machine.

FIG. 9 illustrates a fifth preferred embodiment of the learning and recognition machine of the present invention, wherein a category adding section 13 is included. In the figure, the fine classification sections 1, the in-group similarity calculating section 1a, the weight factor updating section 1b, the major classification section 2, the group dictionary 2a, the category discriminating section 3, the teacher signal generating section 4, the learning control section 5, the learning control signal loading section 6, the discrimination signal loading section 7, the multipliers 6a and 7a and the category information memory section 10 operate in the same manner with those described in the third embodiment. In addition to them, according to the present embodiment, the category adding section 13 adds a means for calculating in-group similarity for a new category to the fine classification sections 1 and the category information memory section 10 stores category information belonging to each fine classification section 1.

In operation, though learning and recognition operations are the same with those described in the first embodiment of the learning and recognition machine, the category adding section 13 compares the category information of the category information memory section 10 with the teacher signal output from the teacher signal generating section 4 and causes a category to which the input pattern signal to be learned belongs to belong to the fine classification section when it does not belong to the fine classification section derived from a result of the major classification section. That is, it adds to the fine classification sections a means for calculating in-group similarity to the category to which the input pattern signal belongs. This arrangement will be explained referring to FIG. 4 which illustrates the in-group similarity calculating section 1a of the fine classification section. The input pattern signal currently input is added to the category dictionary of the in-group similarity calculating section 1a in the object fine classification section and new distance calculating section 33, category discriminating section 34, category discriminating section 35, multipliers 36 and 37 for the added category are provided. At the same time, new category information is stored in the category information memory section 10.

As described above, according to the present embodiment, the category adding section 13 adds a means for calculating in-group similarity to a new category to the fine classification section, so that a new pattern having such large fluctuation that disallows to correctly classify in the major classification section may be effectively learned supplementally.

Figure 10:
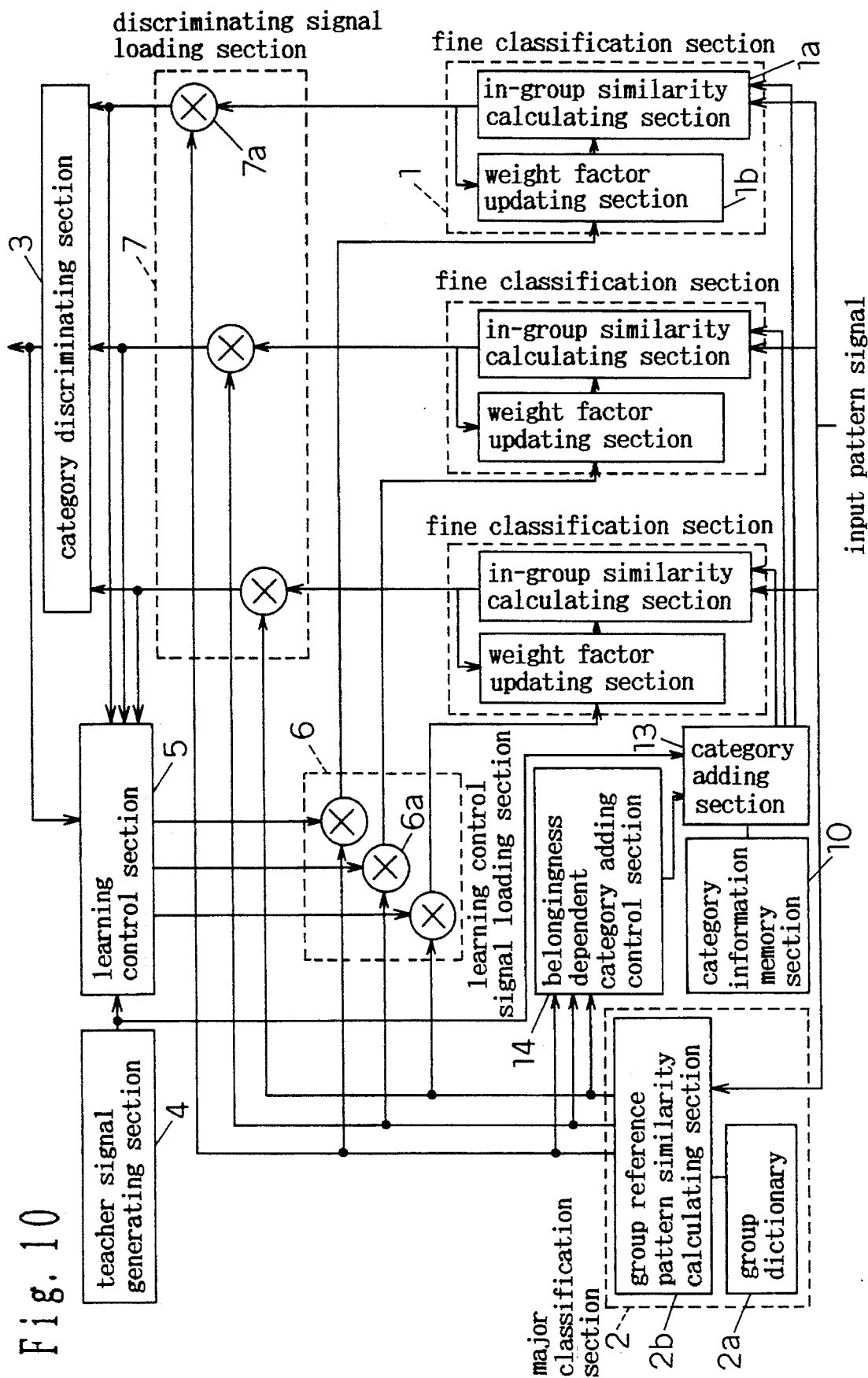
FIG. 10 is a block diagram showing a sixth preferred embodiment of the learning and recognition machine.

FIG. 10 illustrates a sixth preferred embodiment of the learning and recognition machine of the present invention, wherein a belongingness dependent category adding control section 14 is included. In the figure, the fine classification sections 1, the in-group similarity calculating section 1a, the weight factor updating section 1b, the major classification section 2, the group dictionary 2a, the category discriminating section 3, the teacher signal generating section 4, the learning control section 5, the learning control signal loading section 6, the discrimination signal loading section 7, the multipliers 6a and 7a, the category information memory section 10 and the category adding section 13 operate in the same manner with those described in the fifth embodiment. In addition to them, according to the present embodiment, the belongingness dependent category adding control section 14 switches whether the category adding section 13 should add category or not per fine classification section in accordance to the value of group belongingness output by the major classification section 2. For example, no category is added when values of the group belongingness are almost equal among each of the fine classification sections.

Figure 11:
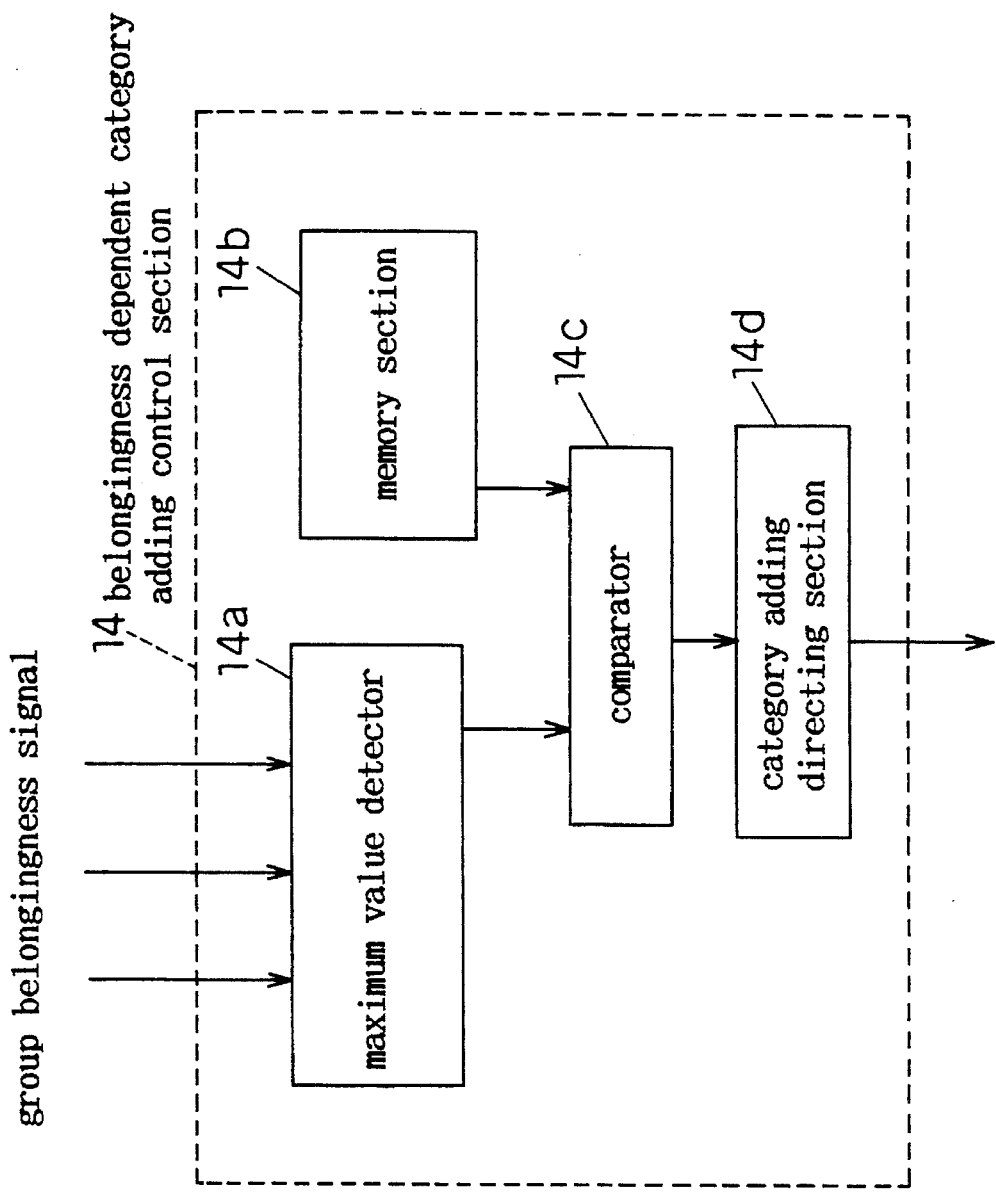
FIG. 11 is a block diagram showing a preferred embodiment of a belongingness dependent category adding control section used in the learning and recognition machine.

FIG. 11 illustrates one preferred embodiment of the belongingness dependent category adding control section 14 used in the learning and recognition machine of the present invention. In the figure, a maximum value detector 14a detects the maximum value of a plurality of input group belongingness signals, a memory section 14b stores values of group belongingness which are criteria for adding a category, a comparator 14c compares the maximum value of the group belongingness detected by the maximum value detector 14a with the group belongingness which is the criterion stored in the memory section 14b and a category adding directing section 14d outputs a direction signal to add category when the maximum value of the group belongingness exceeds the criterion group belongingness based on the comparison result of the comparator 14c.

In operation, the recognition operation is the same with that described in the first embodiment of the learning and recognition machine. Though the learning operation is the same with that described in the fifth embodiment of the learning and recognition machine, the belongingness dependent category adding control section 14 controls the category adding section 13 so that, when a category to which an input pattern signal to be learned belongs does not belong to a fine classification section that is to learn, the category adding section 13 adds categories not to all the object fine classification sections all the time, but only when the group belongingness of the category group belonging to the object fine classification section exceeds a predetermined criterion. It is also possible to select only a portion of fine classification sections having larger group belongingness as objects to which the category is added.

As described above, the present embodiment allows effective supplemental learning by switching so that categories are added only when a category deviates significantly from the classification criterion of the major classification section 2 and learning by means of modification of weight of the in-group similarity calculating section is carried out in other cases.

Figure 12:
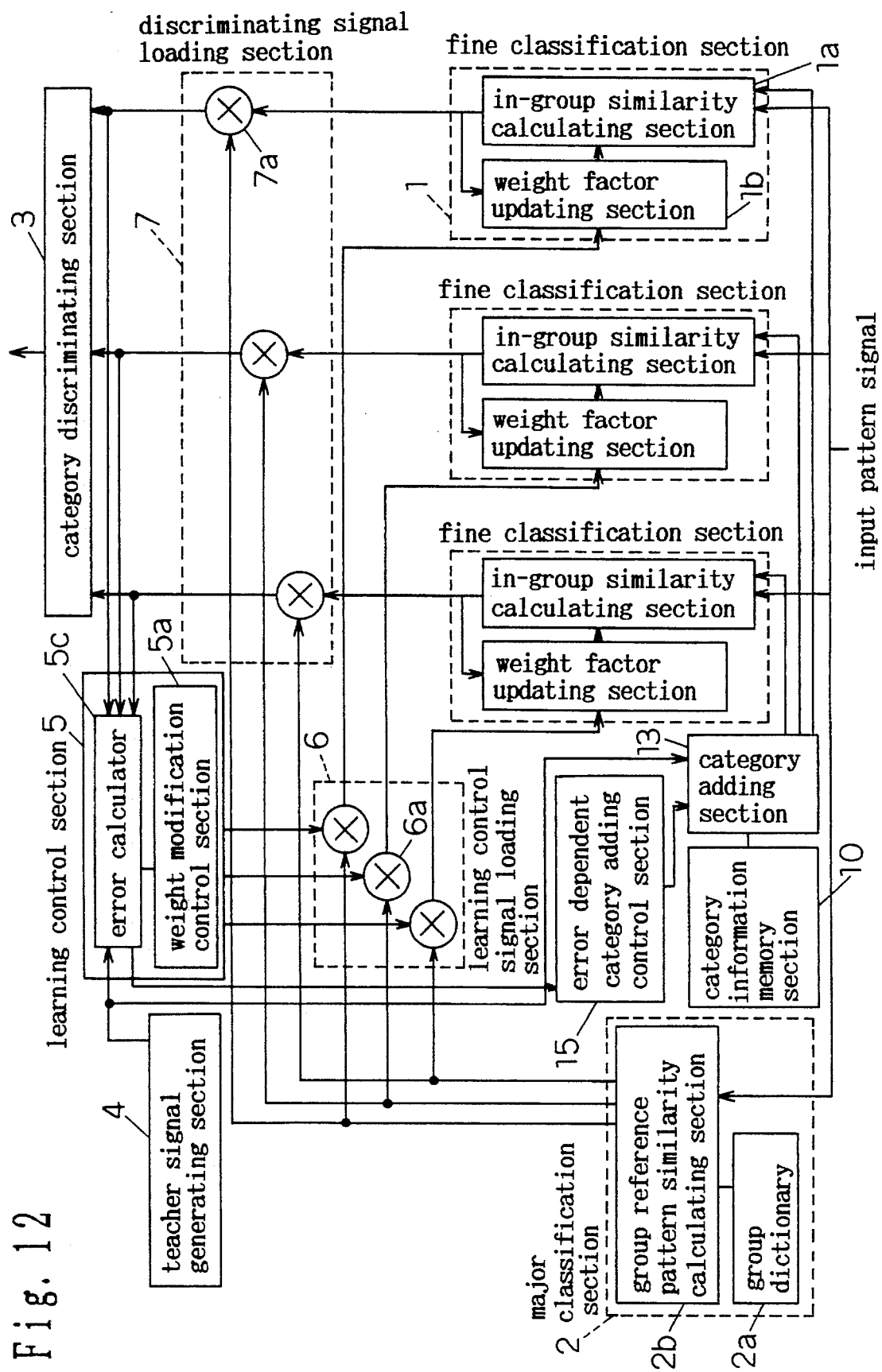
FIG. 12 is a block diagram showing a seventh preferred embodiment of the learning and recognition machine.

FIG. 12 illustrates a seventh preferred embodiment of the learning and recognition machine of the present invention, wherein an error dependent category adding control section 15 is included. In the figure, the fine classification sections 1, the in-group similarity calculating section 1a, the weight factor updating section 1b, the major classification section 2, the group dictionary 2a, the category discriminating section 3, the teacher signal generating section 4, the learning control section 5, the learning control signal loading section 6, the discrimination signal loading section 7, the multipliers 6a and 7a, the category information memory section 10 and the category adding section 13 operate in the same manner with those described in the fifth embodiment. In addition to them, according to the present embodiment, the learning control section 5 comprises an error calculator 5c and weight modification control section 5a and the error dependent category adding control section 15 switches whether the category should be added or not in accordance to the value of learning control signal output by the learning control section 5.

Figure 13:
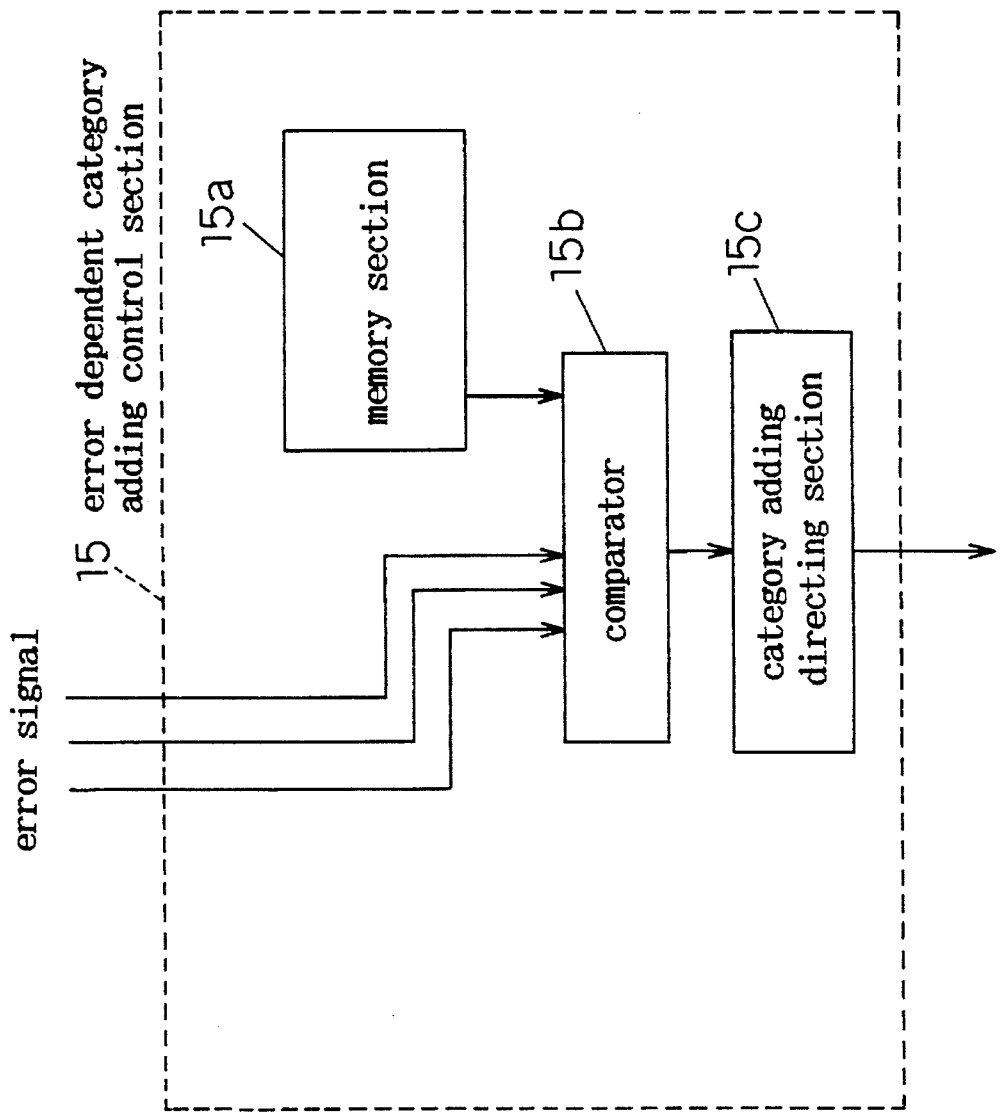
FIG. 13 is a block diagram showing a preferred embodiment of an error dependent category adding control section used in the learning and recognition machine.

FIG. 13 illustrates one preferred embodiment of the error dependent category adding control section 15 used in the learning and recognition machine of the present invention. In the figure, a memory section 15a stores values of error which are criteria for adding category, a comparator 15b compares error signals with the value of error which is the criterion stored in the memory section 15a and a category adding directing section 15c outputs a direction signal to add category when the error signal exceeds the criterion error value based on the comparison result of the comparator 15c.

Figure 14:
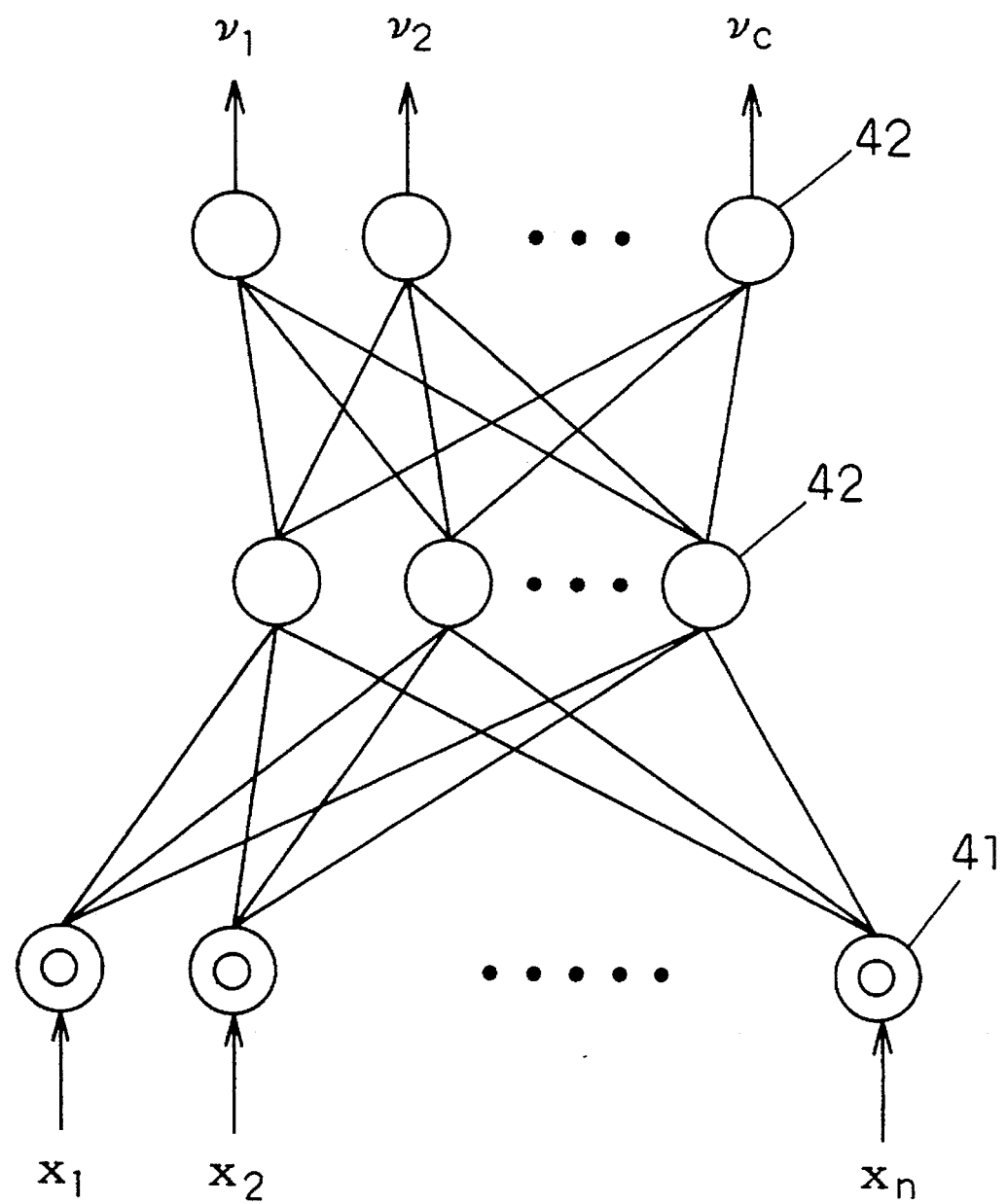
FIG. 14 is a block diagram showing a second preferred embodiment of the similarity calculating section used in the learning and recognition machine.

FIG. 14 is a block diagram showing a second preferred embodiment of the in-group similarity calculating section 1a. In the figure, input sections 41 input an input pattern signal. Multi-input/output signal processing sections 42 multiply the output of the underlayer input sections 41 connected thereto or of the multiinput-output signal processing section 42 with the weight factor which represents a degree of their connection, respectively, and outputs the sum thereof after implementing a threshold processing thereon. A similarity which is a degree of resemblance of each category in the category group to the input pattern signal is found by connecting the plurality of multiinput-output signal processing sections in a network so as to have a layer structure and to propagate signals only to the upper layers.

Figure 15:
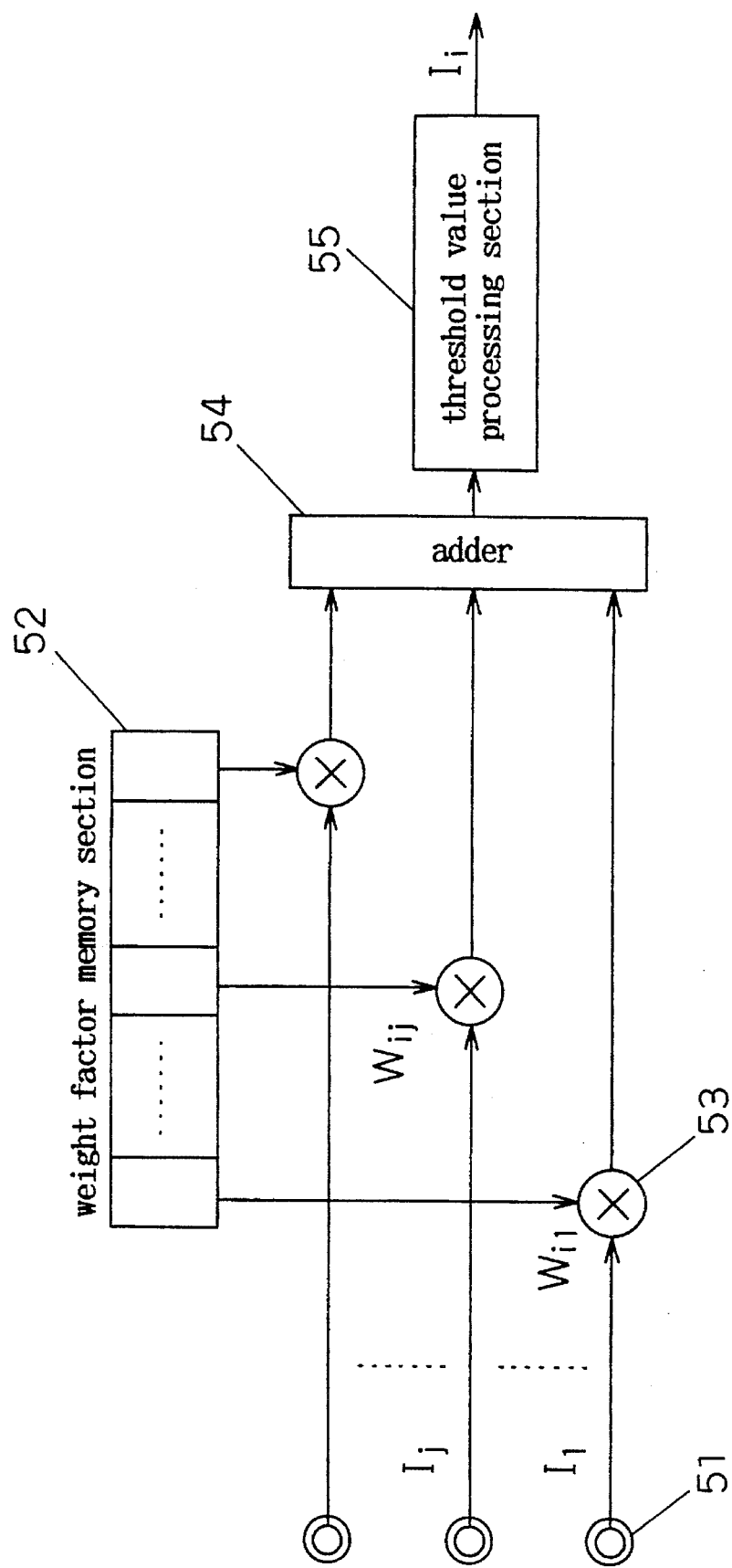
FIG. 15 is a block diagram showing one preferred embodiment of a multiinput-output signal processing section of the second embodiment of the similarity calculating section used in the learning and recognition machine.

FIG. 15 is a block diagram showing a structure of the multiinput-output signal processing section 42 of the second embodiment of the similarity calculating section. In the figure, input sections 51 input input pattern signals. A weight factor memory section 52 stores weight factors for weighting a plurality of input signals from the input Sections 51. Multipliers 53 multiply the weight factor in the weight factor memory section 52 with the input signal from the input sections 51. An adder 54 sums the output values of all the multipliers 53. A threshold value processing section 55 limits the output value of the adder 54 into a value of certain range.

In operation, an input pattern signal X is input to the input sections 41 in the fine classification section 1 similarly to the case in the first embodiment. The input sections 41 are prepared by N equally to the number of feature data of the pattern data and each feature data $x_i$ is input respectively to a corresponding input section 41. Each of the multiinput-output signal processing sections 42 multiplies the output of the underlayer input section 41 connected thereto as shown in FIG. 14 or that of the multiinput-output signal processing section 42 with a weight factor $W_{ij}$ which represents a degree of their connection stored in the weight factor memory section 52 by the multiplier 53, calculates the sum of outputs of each multiplier 53 by the adder 54, transforms the result by the threshold processing section 55 and then outputs the output value to the upper layer. That is, the output value $I_i$ of the i-th multiinput-output signal processing section in a certain layer shown in FIG. 15 may be expressed, assuming an input value to the input section 51 as $I_j$ and weight factor Which indicates a degree of connection of the input connected thereto as $W_{ij}$ (connection weight of the i-th multiinput-output signal processing section and j-th input), as follows:

$$I_i = f(\Sigma_j W_{ij} * I_j) \quad (15)$$

Where $\Sigma_j$ indicates the sum of j.

Figure 16:
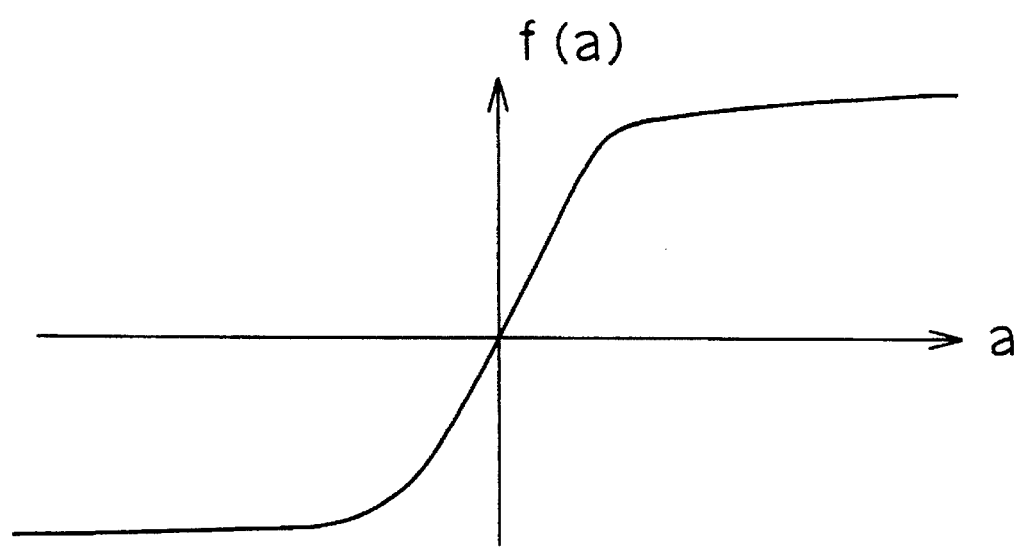
FIG. 16 is a chart showing one preferred embodiment of input/output characteristics of the multiinput-output signal processing section of the second embodiment of the similarity calculating section used in the learning and recognition machine.

FIG. 16 is a chart showing input/output characteristics of the threshold value processing section 55. For example, the input/output characteristics of the threshold value processing section 55 which limits the output to a range of (0, 1) may be expressed as follows:

$$f(a) = 1/(1 + \exp(-a + \theta)) \quad (16)$$

Where, a is an input to the threshold value processing section 55. By the way, the input/output characteristics of the threshold value processing section 55 may be a threshold function other than above.

The multiinput-output signal processing sections 42 in the upper most layer are set to be the same number with the number of categories of the input pattern signal included in each category group and each of them corresponds to each of those categories. That is, the output of the each of the multiinput-output signal processing sections 42 in the upper most layer is output to the discrimination signal loading section 7 as a similarity which is a degree of resemblance of each category in the category group to the input pattern signal.

In operation, the recognition operation is the same with that described in the first embodiment of the learning and recognition machine. Though the learning operation is the same with that described in the fifth embodiment of the learning and recognition machine, the error calculator 5c calculates a difference of the output value of the discrimination signal loading section 7 with the teacher signal per category and calculates error vector $E = (e_1, e_2, \ldots, e_{Nc})$ as follows:

$$E_i = T_i - \Sigma \xi_i \quad (1 \leq i \leq Nc; \text{ Nc is the number of category}) \quad (17)$$

Where, $E_i$ indicates an error to the i-th category, $T_i$ the teacher signal to the i-th category, and $\Sigma \xi_i$ the sum of outputs of all the multipliers 7a that correspond to the i-th category. The weight modification control section 5a outputs the error calculated in the error calculator 5c to the learning control signal loading section 6 as a learning control signal.

The learning control signal loading section 6 multiplies the learning control signal E and the group belongingness by the multiplier as follows;

$$E'_{ip} = E_i * \mu_p \quad (18)$$

and outputs to the weight factor updating section 1b of the corresponding fine classification section 1. Where, $E'_{ip}$ indicates a loaded learning control signal, $E_i$ a learning control signal to the i-th category and $\mu_p$ a group similarity to the fine classification section p to which the loaded learning control signal is input.

The error dependent category adding control section 15 controls the category adding section 13 so that, when a category to which an input pattern signal to be learned belongs does not belong to a fine classification section that is to learn, the category adding section 13 adds categories not to all the object fine classification sections all the time, but only when the the value of the learning control signal exceeds a predetermined criterion.

As for the method for modifying weights, it is possible to handle outputs of the learning control signal loading section 6 as error signals and to update the weights in the direction to reduce the error using the aforementioned back-propagating errors method.

As described above, the present embodiment allows effective supplemental learning by switching so that categories are added only when a category deviates significantly from the discrimination criterion of the present learning and recognition machine and learning by means of modification of weight of the in-group similarity calculating section is carried out in other cases. By the way, the error dependent category adding control section 15 may be used together with the belongingness dependent category adding control section 14 described above.

Figure 17:
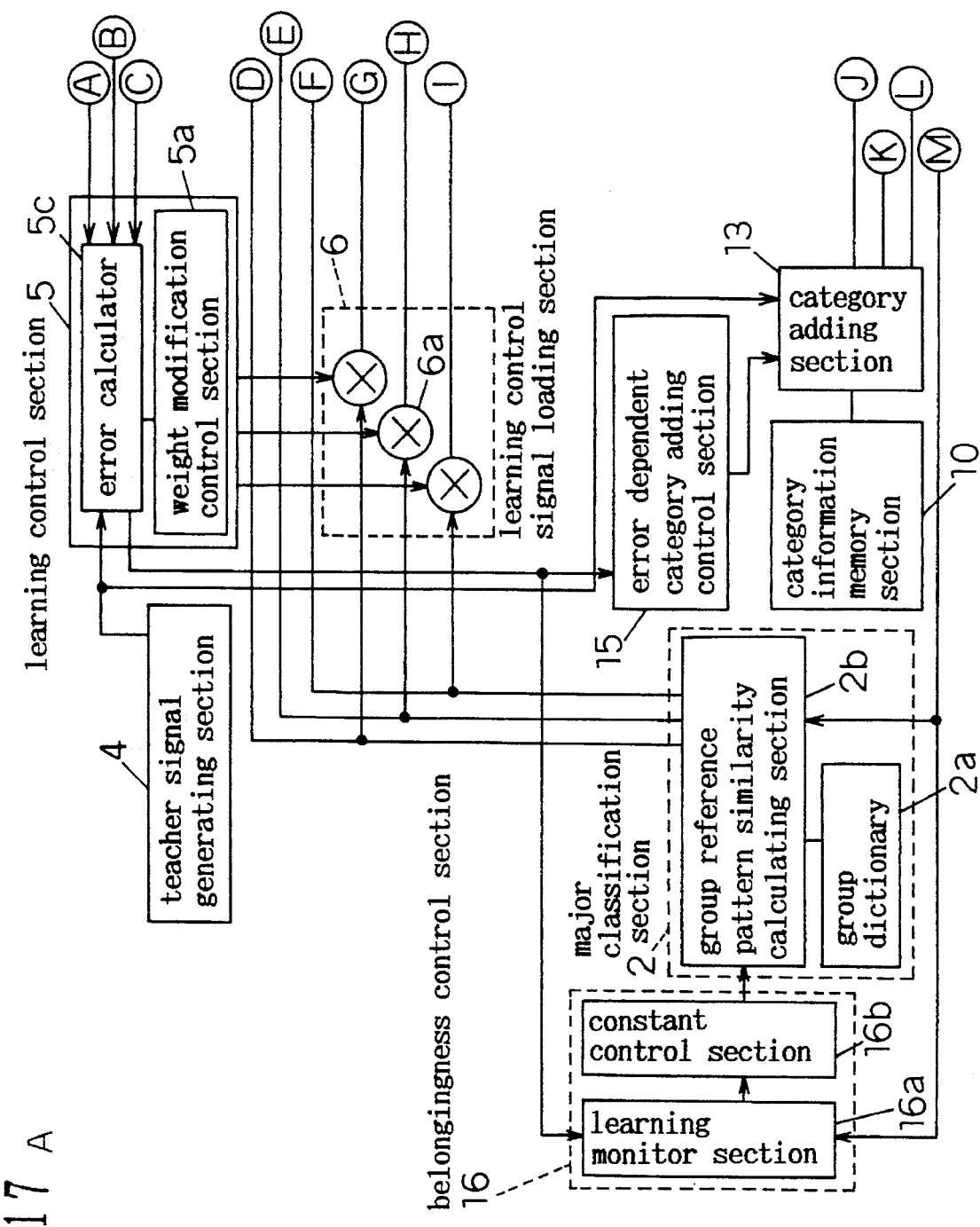
FIG. 17 (represented by FIGS. 17A and 17B) is a block diagram showing an eighth preferred embodiment of the learning and recognition machine.
Figure 17B:
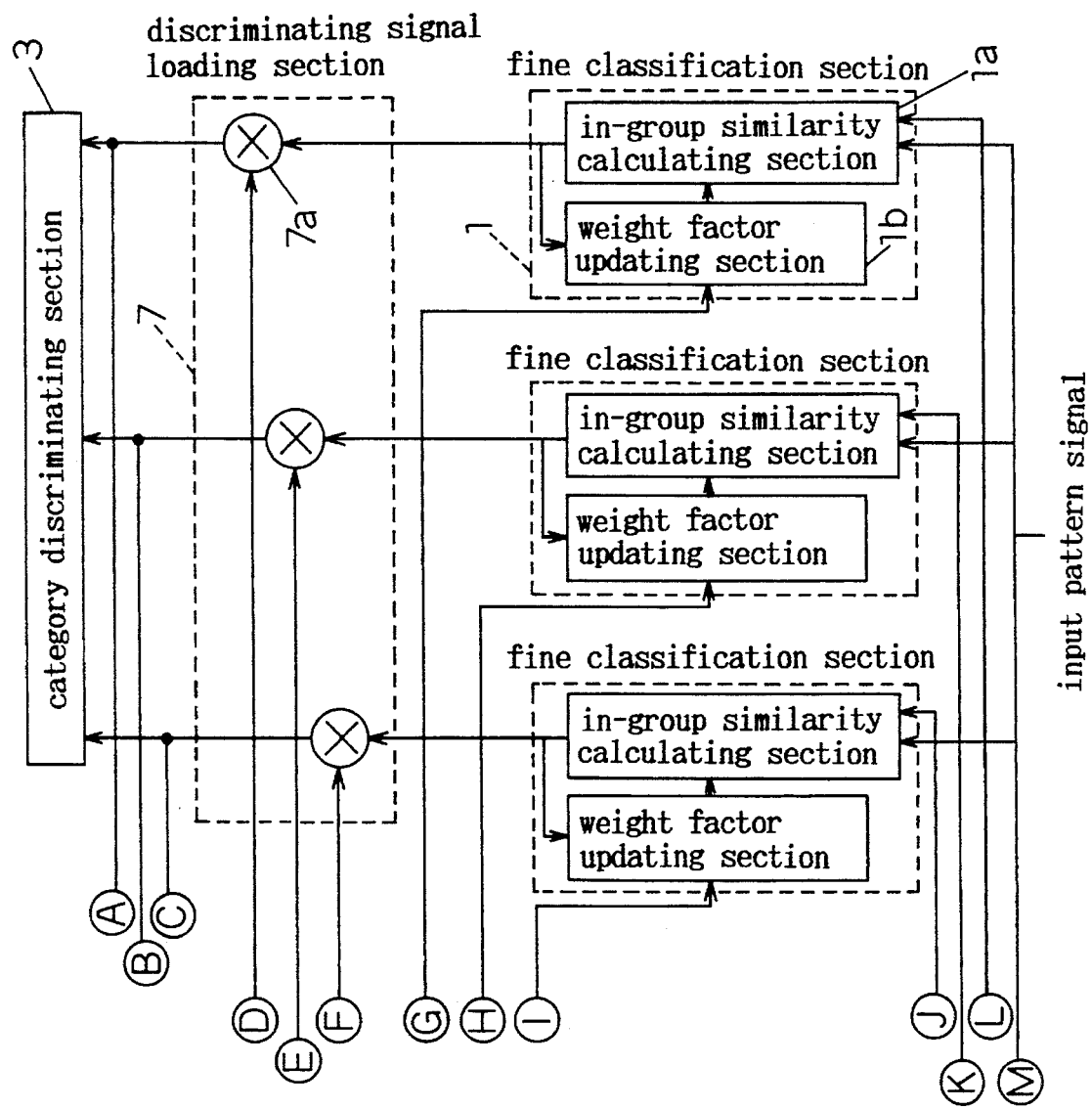

FIG. 17 illustrates an eighth preferred embodiment of the learning and recognition machine of the present invention, wherein a belongingness control section 15 is included. In the figure, the fine classification sections 1, the in-group similarity calculating section 1a, the weight factor updating section 1b, the major classification section 2, the group dictionary 2a, the category discriminating section 3, the teacher signal generating section 4, the learning control section 5, the learning control signal loading section 6, the discrimination signal loading section 7, the multipliers 6a and 7a, the category information memory section 10, the category adding section 13 and the error dependent category adding control section 15 operate in the same manner with those described in the seventh embodiment. The learning control section 5 operates the same manner with that shown in FIG. 11 and the group reference pattern similarity calculating section 2b of the major classification section 2 operates the same manner with that shown in FIG. 2. In addition to them, according to the present embodiment, a learning monitor section 16a monitors a variation of errors of an error calculating section 5c and a number of times for inputting learning patterns and a constant control section 16b changes the value of constant used for the calculation of the distant calculating section 22 of the major classification section 2 based on the monitor result of the learning monitor section 16a.

Figure 18:
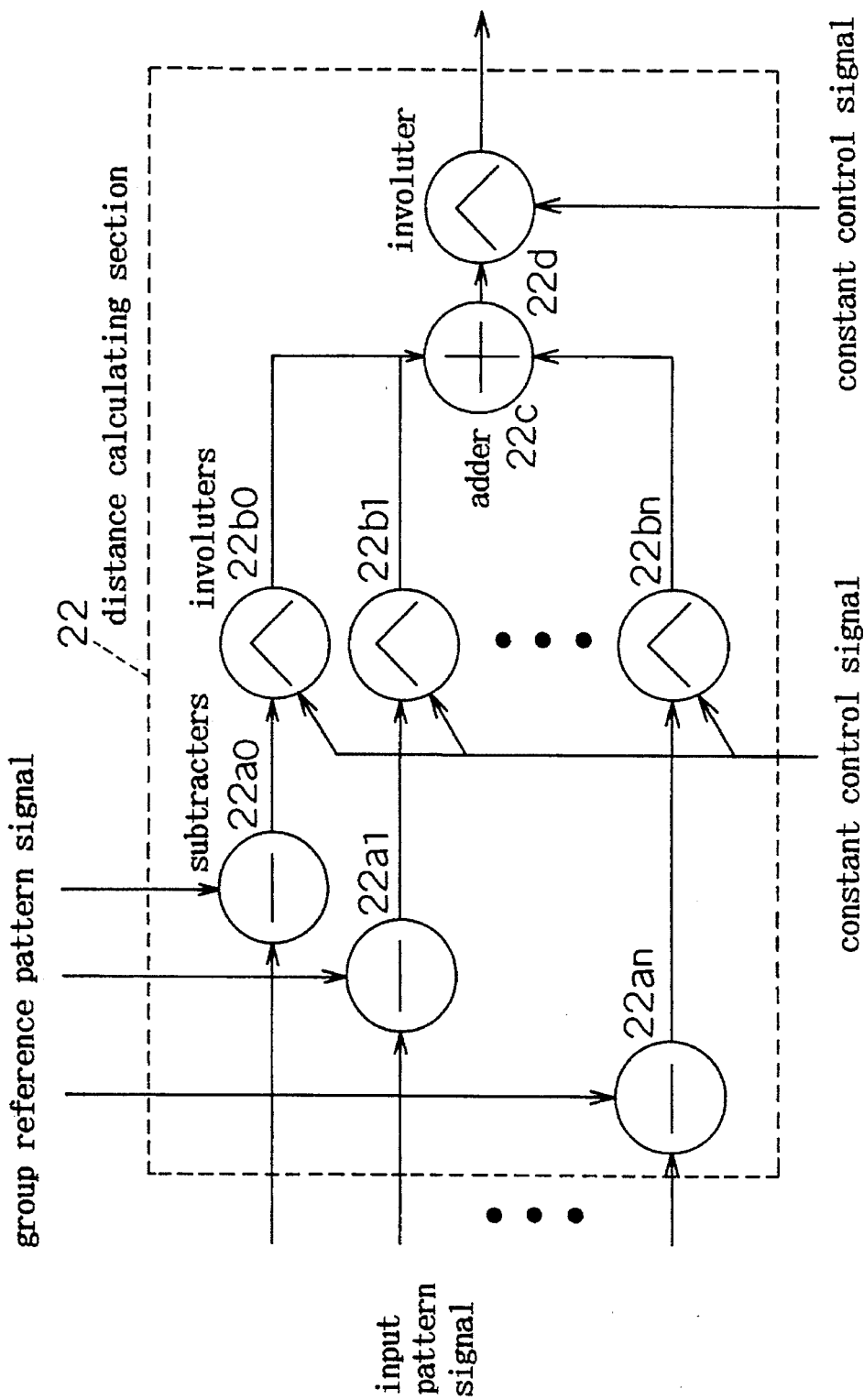
FIG. 18 is a block diagram showing one preferred embodiment of a distance calculating section used in the learning and recognition machine.

FIG. 18 illustrates one preferred embodiment of the distance calculating section used in the major classification section of the present invention. Subtracters $22a_0$–$22a_n$ (n is the number of feature data of a pattern data) calculate a difference of a group reference pattern signal and the input pattern signal, involuters $22b_0$–$22b_n$ calculate the powers of the output of the subtracters, an adder $22c$ calculates the sum of the outputs of the involuters and an involuters $22d$ calculates the power of the output of the adder.

In operation, the recognition operation is the same with that described in the first embodiment of the learning and recognition machine. Though the learning operation is the same with that described in the seventh embodiment of the learning and recognition machine, the belongingness control section 16 calculates group belongingness so that a small number of category groups have a relatively large group belongingness and changes the method for calculating group belongingness as the learning progresses so that more category groups have a relatively large group belongingness. The progress of the learning is monitored by the learning monitor section 16a. The learning monitor section 16a directs the constant control section 16b to modify the constant when the number of patterns input exceeds a predetermined criterion or when variation of errors is lower than a predetermined criterion based on the output of the error calculating section 5c. Upon receiving the direction from the learning monitor section 16a, the constant control section 16b increases exponents of involution of the involuters $22b_0$–$22b_n$ of the distance calculating section 22 and sets that of the involuter $22d$ to the inverse number of the involuters $22b_0$–$22b_n$. In Expression 8, this may be realized by changing f. That is, in the initial period of learning, the group belongingness has a large value only for one category group and other category groups have relatively small values by giving to f a value that is very close to 1. By increasing the value of f as the learning progresses, a plurality of category groups comes to have a relatively large group belongingness. Because the value of modification of weight during learning is proportional to group belongingness and because only a small number of category groups are intensely selected in the initial period of learning, only a portion of fine classification sections learn one input pattern signal and as the learning progresses, many fine classification sections begin to learn, allowing to shift to coordinated learning smoothly.

According to the present embodiment, it becomes possible to prevent the balance of weight factor as a whole from being destroyed by modification of local weights and to implement an effective supplemental learning by progressing the learning effectively by localized learning in the initial period of learning when an adequate weight is not acquired yet in each fine classification section and by implementing the learning in the coordinated manner in the later period of learning or in the stage of supplemental learning.

Figure 19:
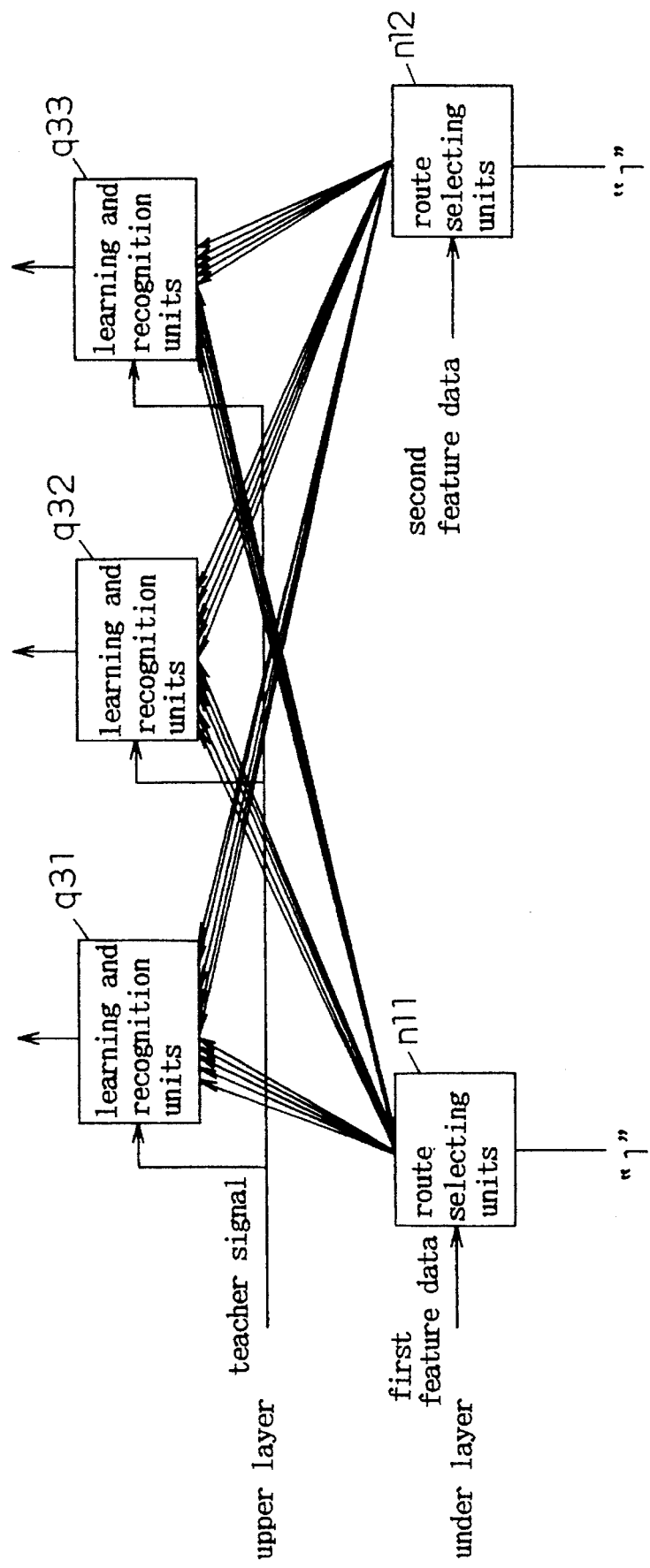
FIG. 19 is a block diagram showing a third preferred embodiment of the fine classification section used in the learning and recognition machine.

FIG. 19 is a block diagram showing a third preferred embodiment of the in-group similarity calculating section 1a. In the present embodiment, similarity of 2 sets of input pattern signals (first feature data and second feature data) to three categories is calculated. A plurality of route selecting units n are combined to construct branch structures and one branch structure comprises a layer structure of two layers. The under layer is composed of route selecting units n11–n12 and the upper layer is composed of learning and recognition units q31–q33. Feature data to be discriminated is input to a signal input section of each route selecting unit and a teacher signal is input to the teacher signal input section.

Figure 20:
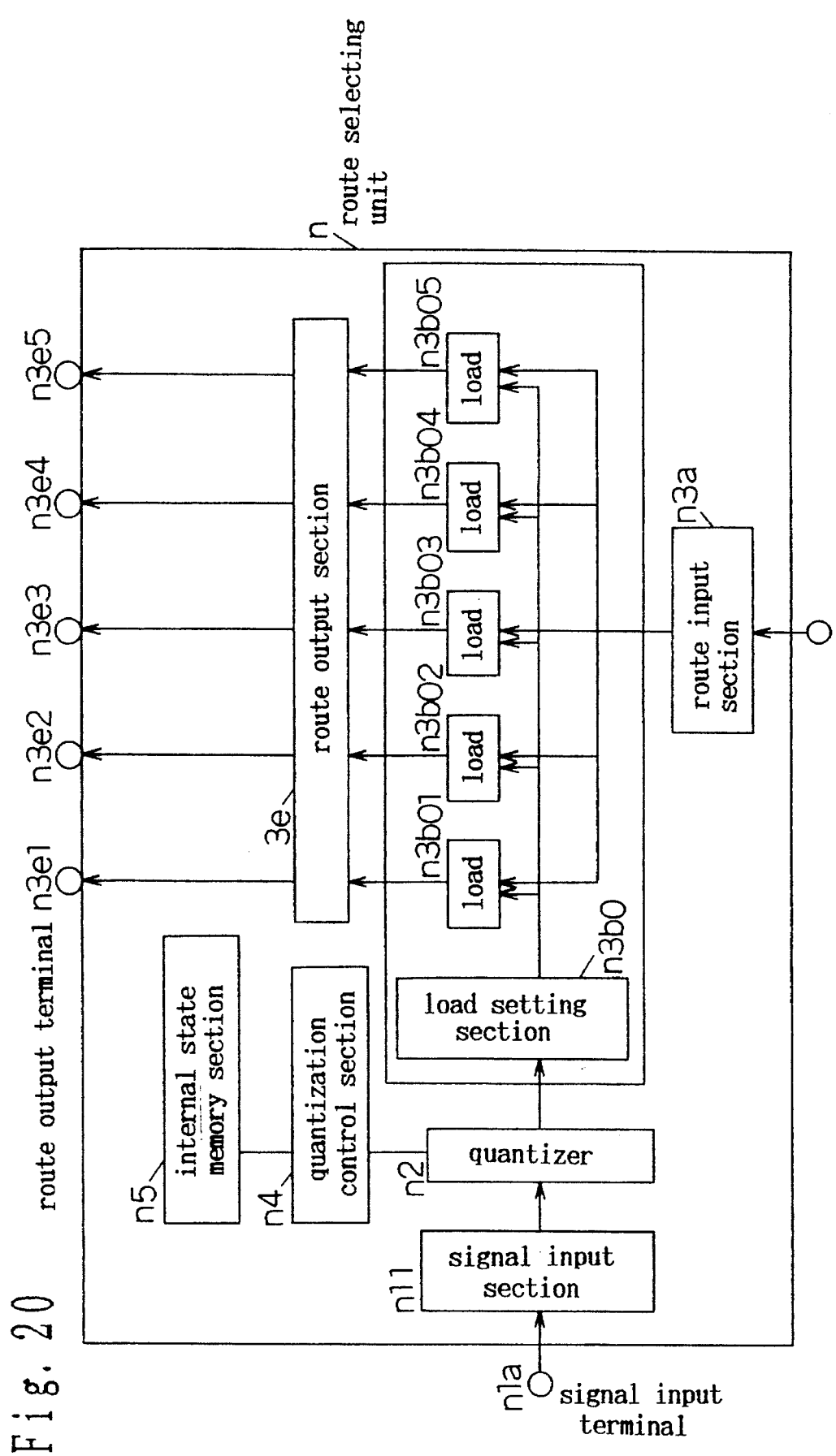
FIG. 20 is a block diagram showing one preferred embodiment of a route selecting unit of the third embodiment of the fine classification section used in the learning and recognition machine.

FIG. 20 shows one preferred embodiment of the route selecting unit used for the third embodiment of the in-group similarity calculating section 1a. A signal input section n1 inputs an input signal to be recognized to a quantizer n2 via a signal input terminal n1a. The quantizer n2 quantizes the signal input and outputs the result thereof to route loading section n3b. A route input section n3a inputs a route signal input via a route input terminal n3a0 to the route loading section n3b. Route output terminals n3e1 through n3e5 are linked each other when the route selecting units or the learning and recognition units are combined hierarchically.

The route loading section n3b comprises loads n3b01 through n3b05 and a load setting section n3b0 that sets the value of load to the loads n3b01 through 3605 in accordance to the result of quantization. In the route loading section n3b, the load setting section n3b0 sets the load value to a load that corresponds to each quantization level based on the result of quantization of the input signal by the quantizer n2. That is, the load setting section n3b0 allocates values of each load based on the quantization result. The loads n3b01 through n3b05 weight the route signal input from the route input section and the route output section n3e outputs the weighted route signal to the route output terminals n3e1 through n3e5. A quantization control section n4 changes a quantizing range of the quantizer n2 and the number of loads to which the load values are allocated by the route setting section n3b0 based on the internal state of the route selecting units stored in an internal state memory section n5. That is, not all the loads contained in the route loading section n3b are used, and the quantization control section n4 changes the necessary number based on the memory content of the internal state memory section n5 as necessary.

Figure 21:
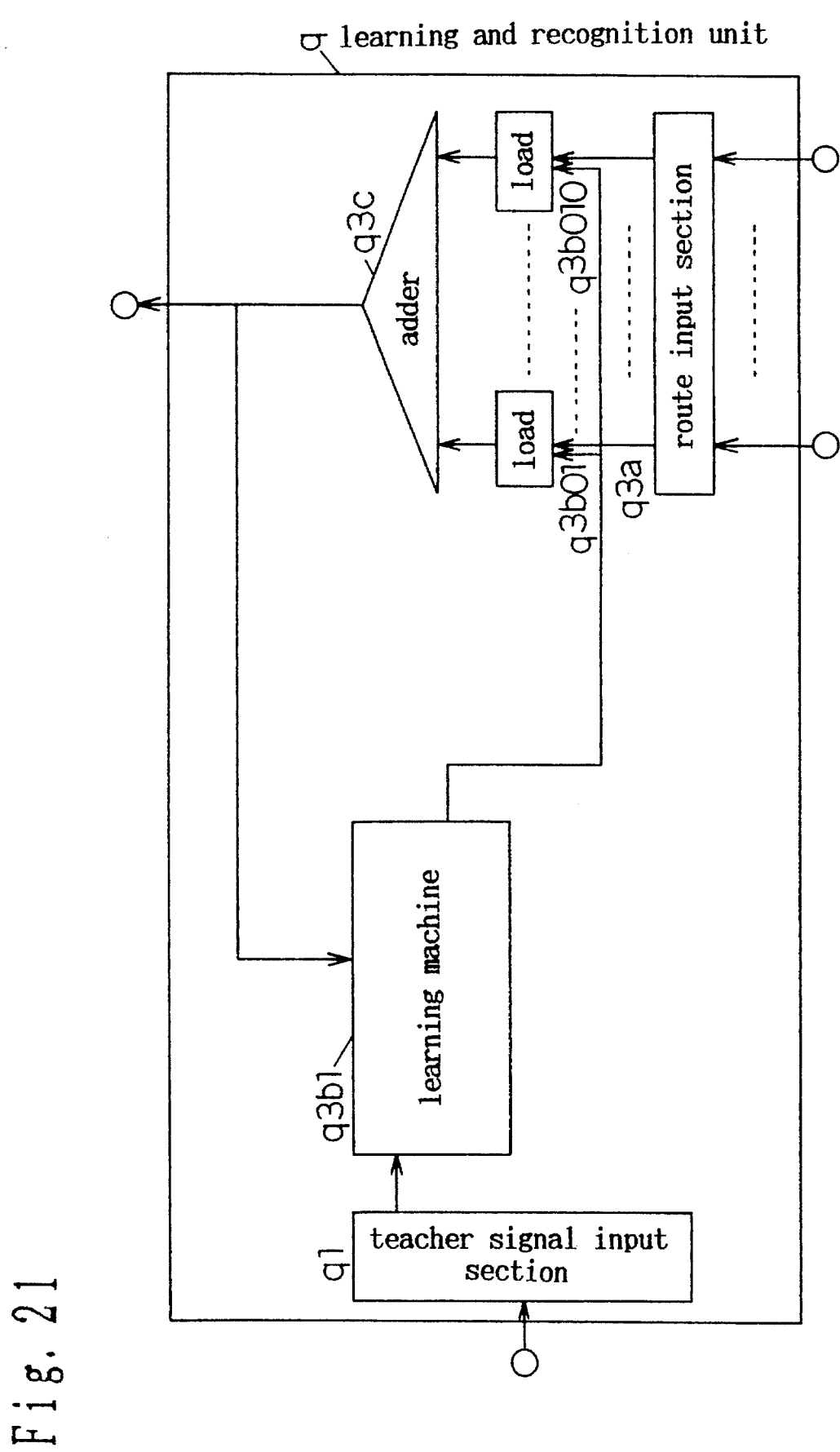
FIG. 21 is a block diagram showing one preferred embodiment of a learning and recognition unit of the third embodiment of the fine classification section used in the learning and recognition machine.

FIG. 21 shows one preferred embodiment of the learning and recognition unit used in the third embodiment of the in-group similarity calculating section 1a of the present invention. The learning and recognition unit q comprises a teacher signal input section q1, a route input section q3a, a route loading section q3b, loads q3b01 through q3b010 for weighting input values of the route input section q3a, a learning machine q3b1 for modifying the coupling load and an adder q3c for adding outputs of weighted loads.

The learning machine q3b1 determines values of the loads q3b01 through 3b050 based on the output of the learning and recognition units and the input value from the teacher signal input section q1.

Now the learning operation of the similarity calculating section structured as described above will be explained. "1" is given as a route input signal to the route input terminals of the route selecting units n11 through n12 in the under layer of each branch structure. Moreover, feature data of an object to be recognized is input to the signal input terminal to the quantizer of those route selecting units (In the case of this figure, two feature data are input to the route selecting units).

Each route selecting unit quantizes those feature data by the quantizer n2 and based on the quantized value, the load setting section q3b0 sets a load value that corresponds to respective data based on the quantized level. A plurality of routes are thus selected in one route selecting unit and a value which is multiplied with the load value is sent to the upper layer. At this time, the internal state memory section n5 holds the statistic of feature data inputted as internal state and updates the memory content every time when feature data is input. Based on the memory content of the internal state memory section n5, the quantization control section n4 increases the number of loads and routes used in the route loading section n3b to allow to select a more accurate route when feature data inputted in the past vary significantly. In the same time, the quantization control section n4 modifies the quantization criterion of the quantizer n2, conforming to the increase of the routes in the route loading section n3b.

A teacher input signal indicating to which category the signal of the object to be recognized belongs among three categories to be classified is input to the teacher signal input terminal q1a of the learning and recognition unit q in the upper layer. That is "1" is input to a learning and recognition unit which is desired to output the largest value among the learning and recognition units q31 through q33 and "0" is input to the other learning and recognition units. The aforementioned back-propagating errors method and the like may be used as a weight modification method.

Next, a recognition operation of the similarity calculating section shown in FIG. 19 will be explained. First, "1" is given as route signals to the route input terminals of the route selecting units n11 through n12 in the under layer of each branch structure in the totally same manner with the case of the learning operation. Moreover, feature data of the object to be recognized are input to the signal input terminal to the quantizer of those route selecting units (in the case of this figure, two feature data are input to respective route selecting units).

Each route selecting unit quantizes those feature data by the quantizer n2 and based on the quantized value, the load setting section q3b0 sets the load value that corresponds to feature data based on the quantized value. One route is thus selected during recognition and a value obtained by multiplying the route signal with the load value is sent to the input terminals of the learning and recognition units q31 through q33 in the upper layer.

The learning and recognition units in the upper most layer multiplies the input value with the coupling load and outputs a value found by summing by the adder. At this time, a category that is presented by the learning and recognition unit which outputs the largest value among a plurality of learning and recognition units is the recognition result. Further, no load nor threshold value are modified during recognition. Thus the learning and recognition machine can classify and discriminate the object to be recognized based on the input feature data of the object.

Figure 22:
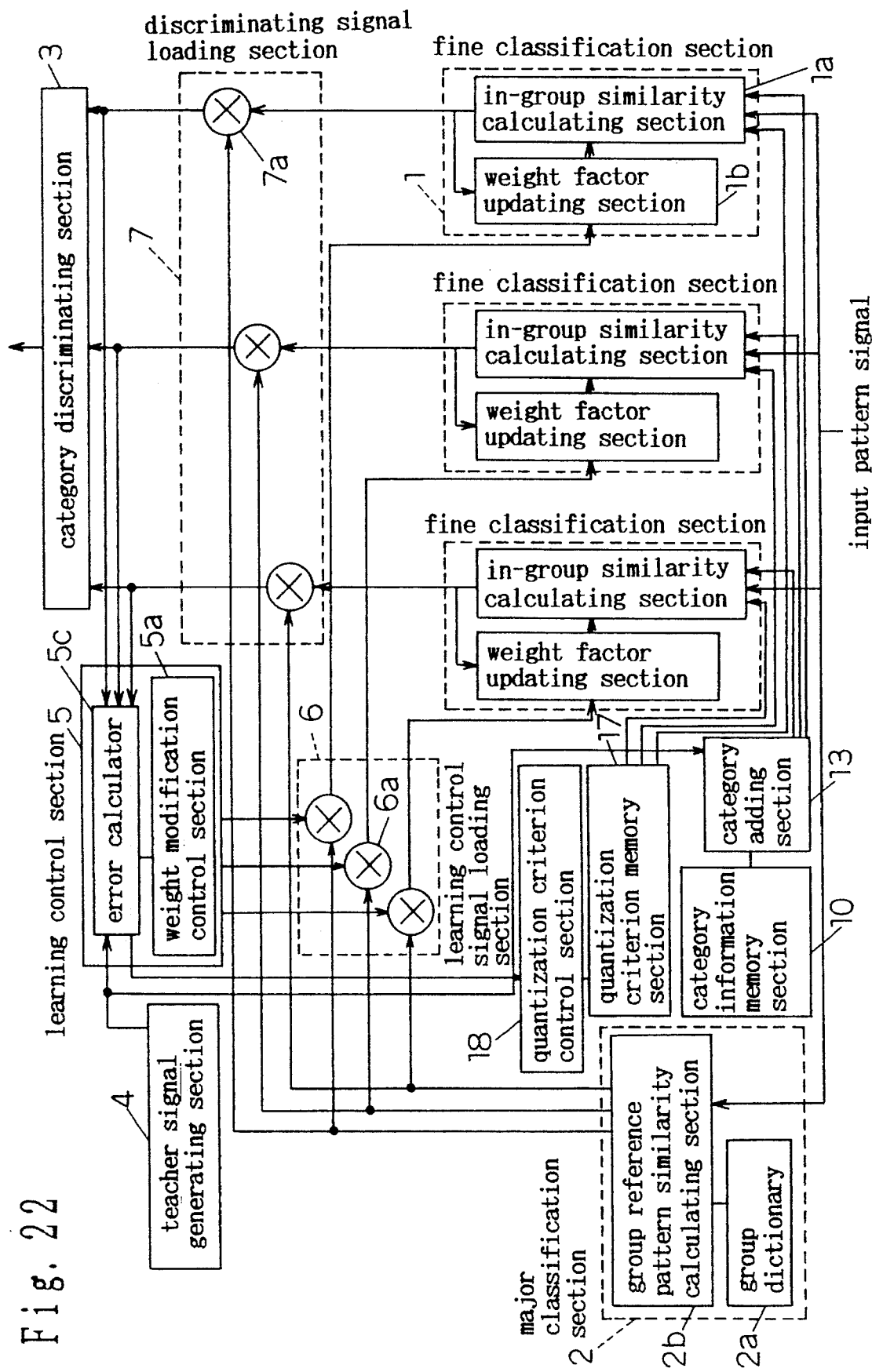
FIG. 22 is a block diagram showing a ninth preferred embodiment of the learning and recognition machine.

FIG. 22 illustrates a ninth preferred embodiment of the learning and recognition machine of the present invention, wherein a quantization criterion memory section and a quantization criterion control section are included. In the figure, the fine classification sections 1, the in-group similarity calculating section 1a, the weight factor updating section 1b, the major classification section 2, the group dictionary 2a, the category discriminating section 3, the teacher signal generating section 4, the learning control section 5, the learning control signal loading section 6, the discrimination signal loading section 7, the multipliers 6a and 7a, the category information memory section 10 and the category adding section 13 operate in the same manner with those described in the seventh embodiment. The group reference pattern similarity calculating section 2b of the major classification section 2 is constructed in the same manner with that shown in FIG. 3 and the similarity calculating section of the fine classification section is constructed in the same manner with that shown in FIG. 19. In addition to them, according to the present embodiment, the quantization criterion memory section 17 stores constants which are used by the quantization control section n4 of the in-group similarity calculating section 1a to compare with memory content of the internal state memory section n5. The quantization criterion control section 18 changes the constants stored in the quantization criterion memory section 17.

Figure 23:
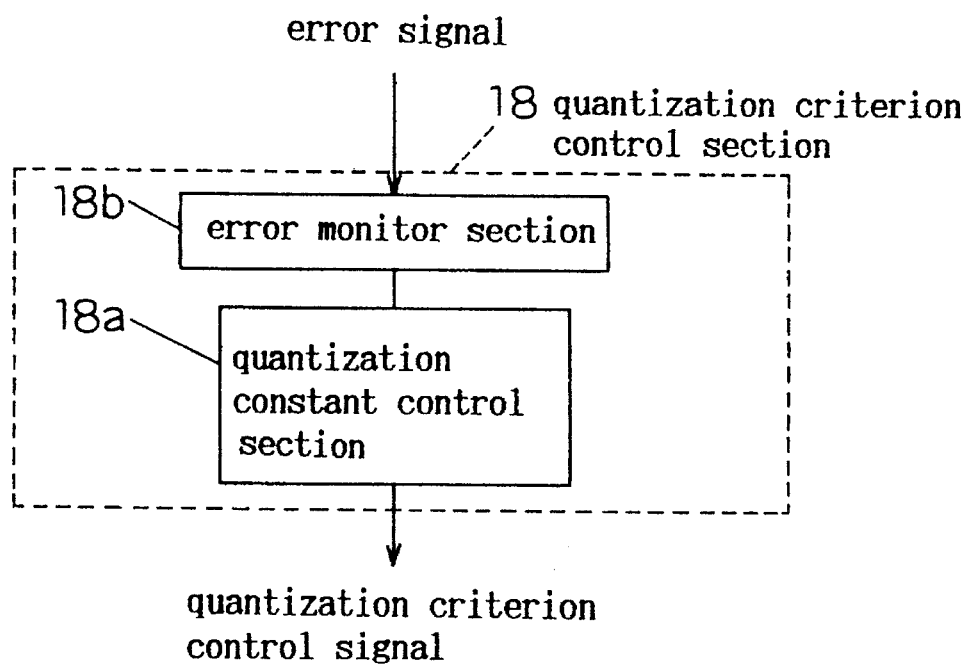
FIG. 23 is a block diagram showing a first preferred embodiment of a quantization criterion control section used in the learning and recognition machine.

FIG. 23 is a block diagram showing a first preferred embodiment of the quantization criterion control section used in the ninth embodiment of the learning and recognition machine of the present invention. In the figure, an error monitor section 18b monitors error signals output by the error calculating section 5c and detects a reduction of errors or reduction of variation of errors. A quantization constant control section 18a changes the constant stored in the quantization criterion memory section 17 based on the result detected in the error monitor section 18b.

Figure 24:
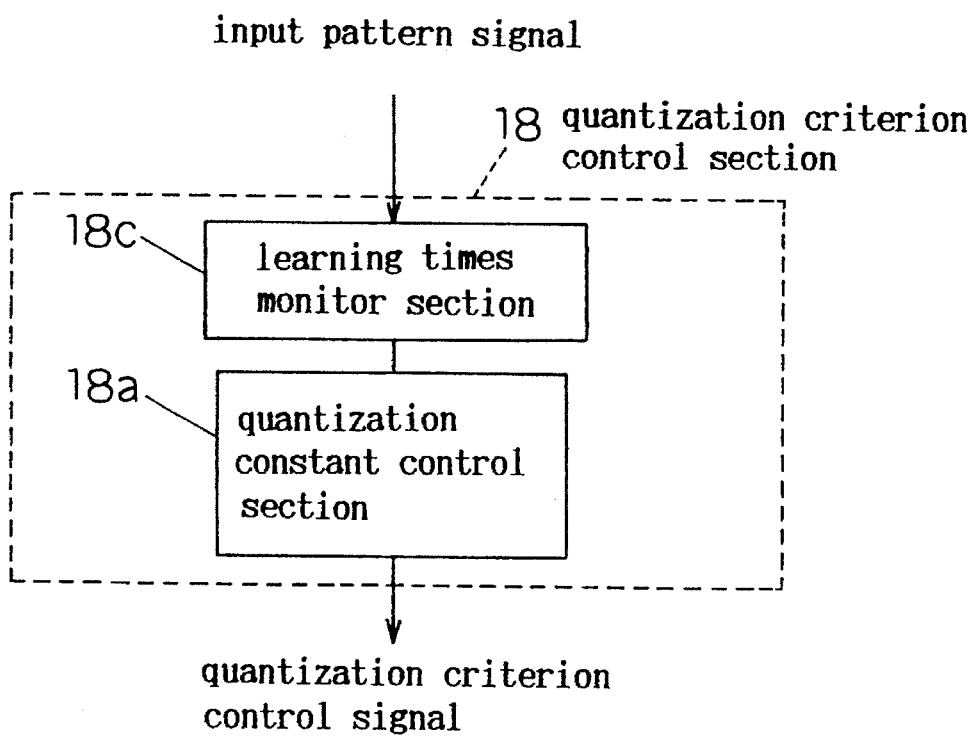
FIG. 24 is a block diagram showing a second preferred embodiment of the quantization criterion control section used in the learning and recognition machine.

FIG. 24 is a block diagram showing a second preferred embodiment of the quantization criterion control section used in the ninth embodiment of the learning and recognition machine. In the figure, a learning times monitor section 18c monitors the number of times of inputs of input pattern signals inputted. The quantization constant control section 18a changes the constant stored in the quantization criterion memory section 17 based on the number of learning times detected in the learning times monitor section 18c.

Figure 25:
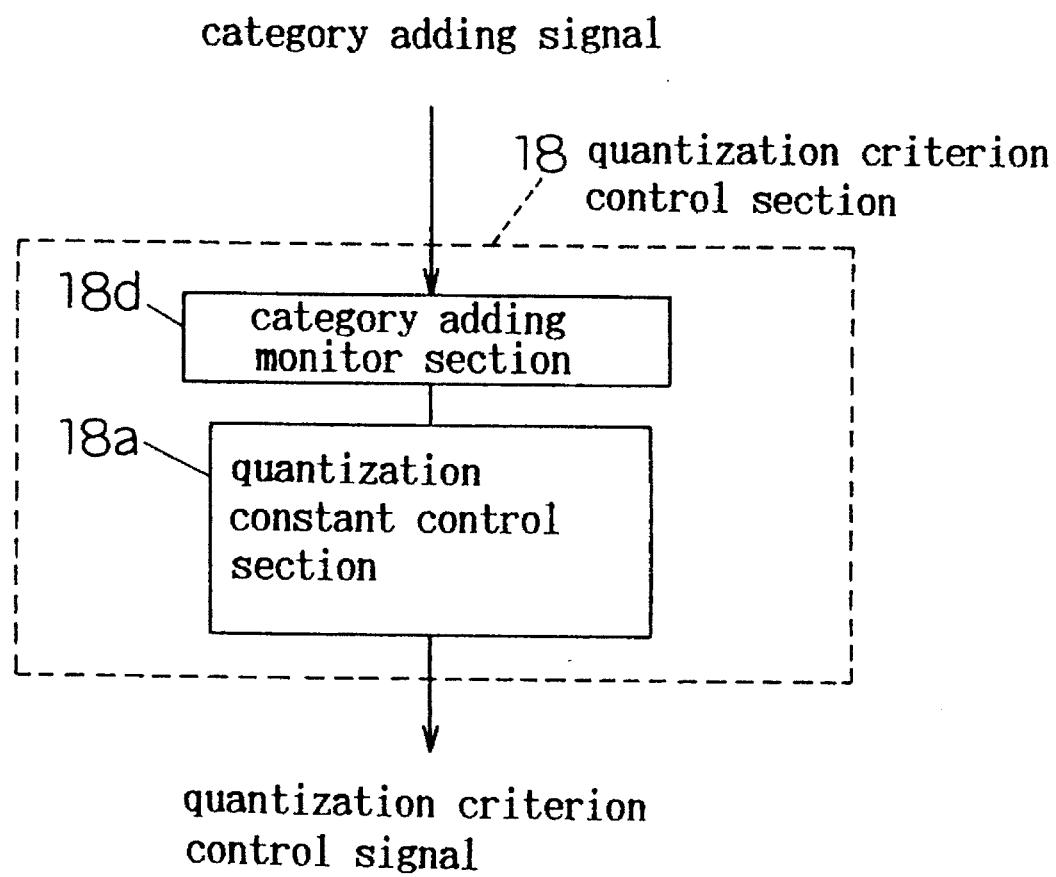
FIG. 25 is a block diagram showing a third preferred embodiment of the quantization criterion control section used in the learning and recognition machine.

FIG. 25 is a block diagram showing a third preferred embodiment of the quantization criterion control section used in the ninth embodiment of the learning and recognition machine. In the figure, a category adding monitor section 18d monitors the category adding operation of the category adding section 13. The quantization constant control section 18a changes the constant stored in the quantization criterion memory section 17 when the category adding monitor section 18d detects the addition of category.

The operation of the learning and recognition machine structured as described above will be explained. The recognition operation is the same with that described in the seventh embodiment of the learning and recognition machine. Though the learning operation is the same with that described in the seventh embodiment of the learning and recognition machine, the quantization criterion control section 18 changes the comparison criterion used by the quantization control section n4 per each fine classification section so that detail route selection may be implemented in the route loading section n3b of each fine classification section when an error is large, a number of learning times is small, or a category adding operation is carried out.

According to the present embodiment, effective learning and supplemental learning may be performed in each fine classification section by changing the route selection accuracy in each fine classification section in accordance to error signals, the number of learning times and category adding operations.

What is claimed is:

1. A learning and recognition machine, comprising:

a major classification section for calculating a group belongingness which indicates a degree of how close an input pattern signal belongs to a category group composed of a set of similar categories, a plurality of fine classification sections each having an in-group similarity calculating section for calculating an in-group similarity which indicates a degree of how close said input pattern signal belongs to a category in each category group and a weight factor updating section for updating weight factors of said in-group similarity calculating section;

a discrimination signal loading section for weighting each said in-group similarity by the group belongingness;

a category discriminating section for comparing the weighted in-group similarities output from said discrimination signal loading section;

a teacher signal generating section for generating a teacher signal output necessary for learning;

a learning control section for outputting a learning control signal for controlling weights of each said in-group similarity calculating section based on the teacher signal output from said teacher signal generating section and based on the output of said discrimination signal loading section or of said category discriminating section; and a learning control signal loading section for weighting the learning control signal output from said learning control section by the group belongingness output from said major classification section; and each said weight factor updating section for updating the weight factor of each of said in-group similarity calculating sections being based on the outputs of said learning control signal loading section and of each said in-group similarity calculating section.

2. The learning and recognition machine according to claim 1, wherein said learning control section comprises:

a comparator for comparing the teacher signal output from said teacher signal generating section and a discrimination result of said category discriminating section and a weight modification control section for determining a learning control signal in correspondence to the comparison result of said comparator.

3. The learning and recognition machine according to claim 1, wherein said learning control section comprises:

an error calculating section for calculating a difference of the teacher signal output from said teacher signal generating section and the output of said discrimination signal loading section ,and a weight modification control section for determining a learning control signal in correspondence to the output of said error calculating section.

4. The learning and recognition machine according to claim 3, further comprising:

a category memory section for storing types of categories belonging to each category group;

a category adding section for adding a means for calculating a similarity to a new category to said in-group similarity calculating section in each of said fine classification sections based on the memory contents of said category based on the memory section and the teacher signal; and an error dependent category adding control section for switching per category group whether said category adding section should add a category or not based on the error signal output by said error calculating section.

5. The learning and recognition machine according to claim 4, wherein said error dependent category adding control section comprises:

a memory section for storing a criterion error value, a comparator for comparing the output of said error calculating section with the error stored in said memory section, and:

a category adding directing section for directing said category adding section to add a category when the error exceeds the criterion error value.

6. The learning and recognition machine according to claims 1 further comprising:

a group selecting section for selecting a plurality of category groups based on the group belongingness output by the major classification section and an input signal selecting section for selecting a fine classification section to which the input pattern signal is input based on the selected result of said group selecting section.

7. The learning and recognition machine according to claim 6, further comprising:

a category memory section for storing types of categories belonging to each category group, a limited group selecting section for selecting a plurality of category groups based on memory contents of said category memory section and the group belongingness output by said major classification section and a group selecting section switching section for switching said group selecting section and said limited group selecting section.

8. The learning and recognition machine according to claims 7, further comprising:

a group belongingness loading section for weighting the group belongingness based on the memory contents of said category memory section.

9. The learning and recognition machine according to claim 1, further comprising:

a category memory section for storing types of categories belonging to each category group;

a category adding section for adding a means for calculating a similarity to a new category to said in-group similarity calculating section in each of said fine classification sections based on the memory contents of said category memory section and the teacher signal.

10. The learning and recognition machine according to claim 9, further comprising:

a belongingness dependent category adding control section for switching per category group whether said category adding section should add category or not based on the group belongingness output by said major classification section.

11. The learning and recognition machine according to claim 10, wherein said belongingness dependent category adding control section comprises:

a maximum value detector for finding a maximum value of the group belongingness, a memory section for storing a criterion group belongingness, a comparator for comparing the maximum value of the group belongingness detected by said maximum value detector with the criterion group belongingness stored in said memory section, and a category adding directing section for directing said category adding section to add a category when the maximum value of the group belongingness exceeds the criterion group belongingness.

12. The learning and recognition machine according to claim 1, wherein said major classification section comprises:

a group dictionary for providing a plurality of group reference pattern signals which represent category groups composed of a set of similar patterns, and a group reference pattern similarity calculating section for calculating group belongingness using said group reference pattern signals.

13. The learning and recognition machine according to claims 12, wherein calculation constants used in calculating the group belongingness of said major classification section can be changed.

14. The learning and recognition machine according to claim 13, further comprising:

a learning monitor section for measuring a number of input times of patterns to be learned, and a constant control section; and said constant control section changing the calculation constants used in calculating the group belongingness of said major classification section based on the output of said learning monitor section.

15. The learning and recognition machine according to claim 13, further comprising:

a learning monitor section for calculating output variation of said error calculating section, and a constant control section; and said constant control section changing the calculation constants of said major classification section based on the output of said learning monitor section.

16. The learning and recognition machine according to claim 12, wherein said major classification section comprises:

a plurality of distance calculating sections for calculating distances between the input pattern signal and all group reference pattern signals stored in said group dictionary, a plurality of dividers for calculating an inverse number of an output of said distance calculating section, an adder for adding each of the outputs of said dividers, a plurality of multipliers for multiplying the output of said adder with the outputs of said distance calculating section, and a plurality of dividers for calculating an inverse number of the output of said multipliers.

17. The learning and recognition machine according to claim 16, wherein said distance calculating section of said major classification section comprises:

a signal intensifier comprising a plurality of subtracters for calculating differences of a plurality of signals inputted, an adder and a plurality of involuters, and said belongingness control section comprises a constant control section for changing values of powers of involution of said involuters in said signal intensifier.

18. The learning and recognition machine according to claims 1, wherein said fine classification section comprises a plurality of multiinput-output signal processing sections arranged and connected in a layer structure so that signals are propagated from a lower layer to an upper layer and said multiinput-output signal processing section comprising a weight factor memory section for holding a plurality of weight factors, an input section for inputting a plurality of input signals, multiplying means for weighting the input signals from said input sections by the weight factors stored in said weight factor memory section, adding means for adding the plurality of input signals weighted by said multiplying means, and a threshold value processing section for limiting the output of said adding means into a certain range.

19. The learning and recognition machine according to claims 1, wherein said fine classification section comprises:

a category dictionary in which a plurality of category reference pattern signals that indicate a central value of each category of the input pattern signal are stored, a plurality of distance calculating sections for calculating distances between the input pattern signal and all the category reference pattern signals stored in said category dictionary, a plurality of dividers for calculating the inverse number of the output of said distance calculating section, an adder for adding each of the outputs of said dividers, a plurality of multipliers for multiplying the output of said adder with the outputs of said distance calculating section and a plurality of dividers for calculating the inverse number of the output of said multipliers.

20. The learning and recognition machine according to claim 1, wherein said fine classification section is comprised in a manner that a learning and recognition unit is arranged at an upper layer of a plurality of branch structures which are constructed by combining route selecting units in a layer constitution, each said route selecting unit comprising;

a signal input section, a quantizer for quantizing the signal from the signal input section, a route input section having single or plural route input terminals, a route output section having single or plural route output terminals, a route loading section for selecting a route in accordance to a result of the quantizing of said quantizer, an internal state memory section for storing internal states of the route selecting unit, a quantization control section for changing a number and a range of the quantizing of the quantizer, a structure memorizing section for memorizing a structure of the route selecting unit, and said learning and recognition unit comprising;

a teacher signal input section, a route input section, a loading section for weighting input values of the route input section, an adder for adding outputs from the loading section, and a learning machine for determining a load value of said loading section.

21. The learning and recognition machine according to claim 20, further comprising:

a quantization criterion memory section for storing a comparison reference to contents of the internal state memory section, and a quantization criterion control section for changing contents of the quantization criterion memory section with respect to every fine classification section.

22. The learning and recognition machine according to claim 21, wherein the quantization criterion control section comprises:
an error monitor section for monitoring output variation of the error calculating section, and
a quantization constant control section for changing contents stored in the quantization criterion memory section based on a result by the error monitor section.

23. The learning and recognition machine according to claim 21, wherein the quantization criterion control section comprises:
a learning times monitor section for monitoring a number of times of inputs of pattern signal to be learned, and
a quantization constant control section for changing contents stored in the quantization criterion memory section based on a result by the learning times monitor section.

24. The learning and recognition machine according to claim 21, wherein the quantization criterion control section comprises:
a category adding monitor section for monitoring a category adding operation of a category adding section, and
a quantization constant control section for changing contents stored in the quantization criterion memory section based on a result by the category adding monitor section.

* * * * *